US010927761B2

(12) United States Patent
Rambo

(10) Patent No.: US 10,927,761 B2
(45) Date of Patent: Feb. 23, 2021

(54) REFRESHING HEAT MANAGEMENT FLUID IN A TURBOMACHINE

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 16/386,697

(22) Filed: Apr. 17, 2019

(65) Prior Publication Data

US 2020/0332717 A1    Oct. 22, 2020

(51) Int. Cl.
*F02C 7/14* (2006.01)
*F02C 7/141* (2006.01)

(52) U.S. Cl.
CPC ........ *F02C 7/141* (2013.01); *F05D 2260/232* (2013.01)

(58) Field of Classification Search
None
See application file for complete search history.

(56) References Cited

U.S. PATENT DOCUMENTS

| | | | | |
|---|---|---|---|---|
| 3,842,597 A | * | 10/1974 | Ehrich | F23R 3/04 60/226.1 |
| 4,060,981 A | | 12/1977 | Hampton | |
| 4,773,212 A | * | 9/1988 | Griffin | F02C 7/224 60/226.1 |
| 4,918,923 A | * | 4/1990 | Woollenweber | F02B 37/025 60/597 |
| 5,086,622 A | * | 2/1992 | Warner | B64D 13/06 62/88 |
| 5,452,573 A | * | 9/1995 | Glickstein | F02C 7/185 60/782 |

(Continued)

FOREIGN PATENT DOCUMENTS

EP    3196454 A1    7/2017

OTHER PUBLICATIONS

Ganev et al., Power and Thermal Management for Future Aircraft, 13ATC-0280, SAE 2013 AeroTech Congress & Exhibition, International, 2013, pp. 1-15.

*Primary Examiner* — Michael Lebentritt
(74) *Attorney, Agent, or Firm* — Dority & Manning, P.A.

(57) ABSTRACT

A heat management system for a turbomachine may include a first heat exchanger configured and arranged to receive a first fluid stream from a first duct, a second heat exchanger configured and arranged to receive the first fluid stream after discharging from the first heat exchanger, and a hatch configured to provide fluid communication from a second duct to the first duct so as to introduce a second fluid stream from the second duct to the first duct. A method of cooling fluid streams may include directing a first fluid stream from a first duct across or through a first heat exchanger, directing the first fluid stream across or through a second heat exchanger after discharging from the first heat exchanger, and directing a second fluid stream from a second duct to the first duct, with the second fluid stream flowing through a hatch configured to provide fluid communication from the second duct to the first duct.

20 Claims, 14 Drawing Sheets

(56) References Cited

U.S. PATENT DOCUMENTS

| | | | | |
|---|---|---|---|---|
| 5,483,807 | A * | 1/1996 | Abersfelder | B60H 1/00492 |
| | | | | 1/492 |
| 5,553,449 | A * | 9/1996 | Rodgers | F02C 7/12 |
| | | | | 60/204 |
| 5,768,896 | A * | 6/1998 | Kline | B64D 13/06 |
| | | | | 62/87 |
| 5,906,111 | A * | 5/1999 | Lui | B64D 13/06 |
| | | | | 62/402 |
| 6,128,909 | A * | 10/2000 | Jonqueres | B64D 13/06 |
| | | | | 62/87 |
| 6,250,061 | B1 * | 6/2001 | Orlando | F02C 3/13 |
| | | | | 60/772 |
| 6,308,770 | B1 * | 10/2001 | Shikata | B60H 1/00064 |
| | | | | 165/126 |
| 6,415,595 | B1 * | 7/2002 | Wilmot, Jr. | F02C 7/224 |
| | | | | 60/785 |
| 6,568,203 | B1 * | 5/2003 | Leathers | B64F 1/362 |
| | | | | 62/172 |
| 6,845,630 | B2 * | 1/2005 | Bruno | B64D 13/06 |
| | | | | 62/323.3 |
| 7,334,422 | B2 * | 2/2008 | Zywiak | B64D 13/06 |
| | | | | 62/401 |
| 7,614,210 | B2 | 11/2009 | Powell et al. | |
| 8,387,362 | B2 | 3/2013 | Storage et al. | |
| 8,438,838 | B2 | 5/2013 | Perveiler et al. | |
| 8,522,572 | B2 | 9/2013 | Coffinbeny et al. | |
| 8,756,910 | B2 | 6/2014 | Donovan et al. | |
| 8,789,376 | B2 | 7/2014 | Coffinbeny | |
| 9,045,998 | B2 | 6/2015 | Lo et al. | |
| 9,200,855 | B2 | 12/2015 | Kington et al. | |
| 9,212,623 | B2 | 12/2015 | Murphy et al. | |
| 9,243,563 | B2 | 1/2016 | Lo | |
| 9,790,893 | B2 | 10/2017 | Snyder | |
| 9,797,311 | B2 | 10/2017 | Suciu et al. | |
| 9,840,967 | B2 | 12/2017 | Snyder et al. | |
| 9,945,325 | B2 | 4/2018 | Roberge | |
| 9,964,037 | B2 | 5/2018 | Snyder et al. | |
| 10,543,924 | B2 * | 1/2020 | Bruno | B64D 13/06 |
| 10,549,860 | B2 * | 2/2020 | Bruno | B64D 13/06 |
| 2002/0005038 | A1 * | 1/2002 | Boeck | B64D 33/08 |
| | | | | 60/204 |
| 2005/0268612 | A1 * | 12/2005 | Rolt | F02C 7/185 |
| | | | | 60/728 |
| 2008/0028763 | A1 * | 2/2008 | Schwarz | F01D 25/12 |
| | | | | 60/771 |
| 2009/0165995 | A1 * | 7/2009 | Bajusz | F01D 25/02 |
| | | | | 165/51 |
| 2009/0238677 | A1 * | 9/2009 | Clemen | F04D 29/682 |
| | | | | 415/52.1 |
| 2010/0180573 | A1 * | 7/2010 | Ruston | F02K 3/075 |
| | | | | 60/226.3 |
| 2011/0120075 | A1 * | 5/2011 | Diaz | F02K 1/383 |
| | | | | 60/39.11 |
| 2012/0272658 | A1 * | 11/2012 | Murphy | F01D 17/085 |
| | | | | 60/783 |
| 2013/0145744 | A1 * | 6/2013 | Lo | F01D 17/105 |
| | | | | 60/226.3 |
| 2013/0269366 | A1 * | 10/2013 | Haugen | F02K 3/075 |
| | | | | 60/783 |
| 2015/0128561 | A1 * | 5/2015 | Pesyna | F02K 1/1207 |
| | | | | 60/204 |
| 2015/0129180 | A1 | 5/2015 | Strehlow et al. | |
| 2016/0003149 | A1 * | 1/2016 | Suciu | F01D 25/24 |
| | | | | 60/772 |
| 2016/0090863 | A1 * | 3/2016 | Diaz | F28D 20/003 |
| | | | | 60/39.1 |
| 2016/0108813 | A1 | 4/2016 | Schmitz | |
| 2016/0131035 | A1 * | 5/2016 | Diaz | F28F 27/02 |
| | | | | 60/226.1 |
| 2016/0177828 | A1 | 6/2016 | Snyder et al. | |
| 2016/0245180 | A1 * | 8/2016 | Todorovic | F01D 25/14 |
| 2017/0044984 | A1 * | 2/2017 | Pesyna | B64D 33/10 |
| 2017/0204787 | A1 | 7/2017 | Duesler et al. | |
| 2017/0321602 | A1 * | 11/2017 | Guijarro Valencia | F01D 9/023 |
| 2017/0342911 | A1 * | 11/2017 | Kulkarni | F02C 7/18 |
| 2018/0017342 | A1 * | 1/2018 | Rambo | F28F 9/22 |
| 2018/0215475 | A1 * | 8/2018 | Hurt | B64D 41/00 |
| 2018/0230908 | A1 * | 8/2018 | Pesyna | B64D 29/00 |
| 2018/0371919 | A1 * | 12/2018 | Baralon | F01D 17/105 |
| 2019/0032558 | A1 * | 1/2019 | Van Der Woude | F02C 9/18 |
| 2019/0128189 | A1 * | 5/2019 | Rambo | F02K 3/115 |
| 2019/0195128 | A1 * | 6/2019 | Diaz | F03G 7/065 |
| 2019/0360401 | A1 * | 11/2019 | Rambo | F02C 7/14 |

* cited by examiner

REFRESHING HEAT MANAGEMENT FLUID IN A TURBOMACHINE

FEDERALLY SPONSORED RESEARCH

This invention was made with Government support. The Government has certain rights in this invention.

FIELD

The present disclosure generally pertains to heat management systems in turbomachines and methods of refreshing heat management fluid supplied to heat exchangers in turbomachines.

BACKGROUND

A heat management system may be utilized to manage temperatures of various components or fluid streams of a turbomachine. Typically, a heat management system may utilize existing fluid streams associated with the turbomachine. Such existing fluid streams may include input fluid streams and/or output fluid streams. For example, a heat management system for a turbomachine may utilize relatively cool pressurized fan air such as from a bypass duct to directly or indirectly cool the turbomachine or related components or fluid streams. Such a heat management system may also utilize bleed air extracted from the turbomachine as a heat source and/or as a cooling source for other fluid streams or components.

A heat management system that utilizes existing fluid streams associated with a turbomachine may exhibit greater energy efficiency relative to the use of an external energy source for heating or cooling. However, the use of input streams and/or output streams of a turbomachine for heat management may be limited by upstream use of the fluid stream. Once a fluid stream has been used in a first heat transfer operation, such a fluid stream will generally have less cooling capacity or ability to remove heat in a second heat transfer operation. For example, relatively cool pressurized fan air such as from a bypass duct may be routed through a heat exchanger to directly or indirectly cool the turbomachine or related components or fluid streams. The fan air exiting from the heat exchanger may generally have an increased temperature as a result of heat transferred to the fan air from the heat exchanger and/or a reduced pressure as a result of friction incurred when flowing through the heat exchanger.

These and related issues may detract from the output or performance of a heat management system and/or may require design modifications to the heat management system that come at the cost of an increase in the overall weight or size of the system. These and related issues may also detract from the output or performance of the turbomachine. This may be the case even though the heat management system may be desirable for operation and performance of the turbomachine. For example, design considerations to address such increased temperature and/or reduced pressure in a bypass duct may result in a larger bypass duct so as to increase the amount of pressurized fan air flowing through the bypass duct. Such a larger bypass duct not only adds size and weight to the turbomachine, but also, the use of pressurized fan air such as from a bypass duct for cooling may detract from the thrust generated by the turbomachine even though the resulting cooling may be necessary for operation or performance of the turbomachine.

Accordingly, there exists a need for improved heat management systems that better utilize fluid streams associated with a turbomachine.

BRIEF DESCRIPTION

Aspects and advantages will be set forth in part in the following description, or may be obvious from the description, or may be learned through practicing the presently disclosed subject matter.

In one aspect, the present disclosure embraces heat management systems for turbomachines. An exemplary heat management system for a turbomachine may include a first heat exchanger configured and arranged to receive a first fluid stream from a first duct, a second heat exchanger configured and arranged to receive the first fluid stream after discharging from the first heat exchanger, and a hatch configured to provide fluid communication from a second duct to the first duct so as to introduce a second fluid stream from the second duct to the first duct.

In another aspect, the present disclosure embraces methods of cooling fluid streams. An exemplary method of cooling fluid streams may include directing a first fluid stream from a first duct across or through a first heat exchanger, directing the first fluid stream across or through a second heat exchanger after discharging from the first heat exchanger, and directing a second fluid stream from a second duct to the first duct, with the second fluid stream flowing through a hatch configured to provide fluid communication from the second duct to the first duct.

In yet another aspect, the present disclosure embraces turbomachines that include a heat management system. An exemplary turbomachine may include a core engine, an annular first casing surrounding the core engine, an annular second casing spaced radially outward from the first casing and concentric therewith, and an annular third casing spaced radially between the first casing and the second casing and concentric therewith. A first duct may be defined radially between the annular first casing and the annular third casing, and a second duct may be defined radially between the annular second casing and the annular third casing. A plurality of first heat exchangers may be disposed radially about the first duct, and the plurality of first heat exchangers may be respectively configured and arranged to receive a respective portion of a first fluid stream from the first duct. A plurality of second heat exchangers may be disposed radially about the first duct downstream from the plurality of first heat exchangers, and the plurality of second heat exchangers may be respectively configured and arranged to receive a respective portion of the first fluid stream after discharging from respective ones of the plurality of first heat exchangers. A plurality of hatches may be disposed radially about the annular third casing. The plurality of hatches may respectively provide fluid communication from the second duct to the first duct downstream from the plurality of first heat exchangers. Additionally, the plurality of hatches may be respectively configured and arranged to introduce a respective portion of a second fluid stream from the second duct to the first duct.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
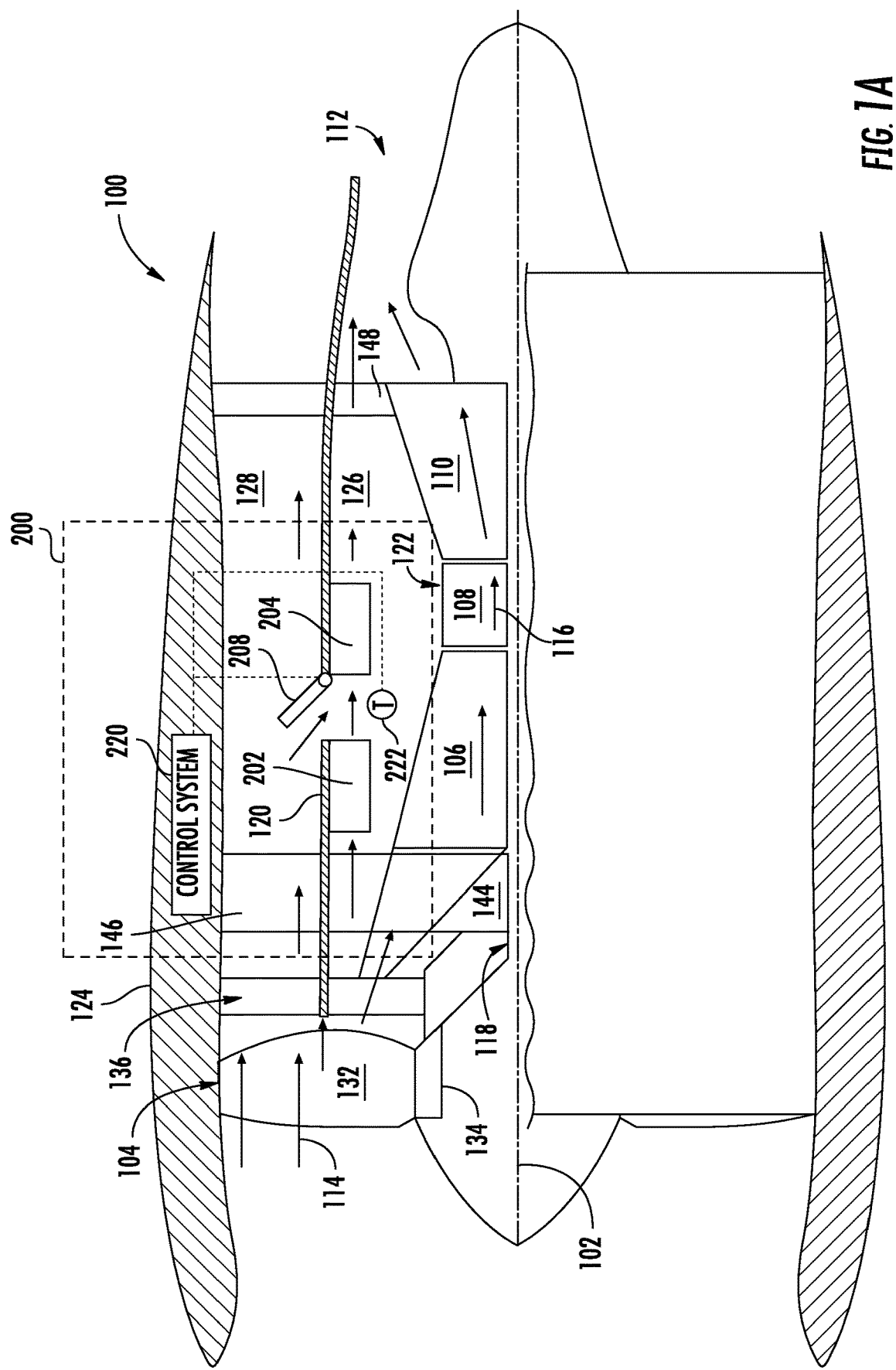
FIG. 1A schematically depicts a perspective cut-away view of an exemplary turbomachine that includes one embodiment of a heat management system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally pertains to heat management systems in turbomachines and methods of refreshing heat management fluid supplied to heat exchangers in turbomachines. The presently disclosed heat management systems include a first heat exchanger configured and arranged to receive a first fluid stream from a first duct and a second heat exchanger configured and arranged to receive the first fluid stream after discharging from the first heat exchanger, and a hatch configured to provide fluid communication from a second duct to the first duct so as to introduce a second fluid stream from the second duct to the first duct. The second fluid stream from the second duct may have a temperature that is lower than that of the first fluid stream discharging from the first heat exchanger. As such, the second fluid stream may be used to refresh the first fluid stream flowing into the second heat exchanger, and thereby improve heat transfer at the second heat exchanger. Additionally, the hatch may be utilized to vary a flow ratio between the first fluid stream and the second fluid stream by introducing fluid from the first fluid stream to the second fluid stream.

The presently disclosed heat management systems and related methods may be implemented in connection with any turbomachine, such as a turbomachine that includes annular inner and outer bypass ducts. A hatch may be configured to introduce a fluid stream from the annular inner to the annular outer bypass ducts, or from the annular outer bypass duct to the annular inner bypass duct, thereby enhancing allocation of heat management operations between the respective fluid streams of the bypass ducts. For example, the optimal heat energy and/or fluid flow through the respective bypass ducts may vary depending upon operating conditions of the turbomachine.

The presently disclosed fluid exchange apparatuses and related systems and methods allow for decoupling the thermal performance of heat exchangers arranged in serial flow communication within a duct. Rather than having the performance of a downstream heat exchanger dependent on the temperature of a heated fluid stream from an upstream heat exchanger, a hatch may introduce fluid from another duct to adjust the cooling capacity of the heated fluid stream discharging from an upstream heat exchanger, such as with cooler fluid from another duct. A first heat exchanger may be located upstream from a second heat exchanger, with both heat exchangers located in the same duct. The presently disclosed heat management systems and related methods provide for the heated cooling air discharging from the first heat exchanger to be refreshed with relatively cooler air introduced from another duct, thereby providing relatively cooler cooling air to the second heat exchanger.

For example, a compressor bleed air heat exchanger may be located upstream from a cooled cooling air heat exchanger, with both heat exchangers located in an annular inner duct (which may be a thermal management system duct). The compressor bleed air heat exchanger may receive relatively cool air from the annular inner duct, and the heated cooling air discharging from the compressor bleed air heat exchanger may be refreshed with relatively cool air from the annular outer duct (which may be a fan duct or a bypass duct), thereby allowing the cooled cooling air heat exchanger to receive relatively cooler air having been refreshed with air from the annular outer duct rather than being dependent on the heated air discharging from the compressor bleed air heat exchanger.

As another example, a compressor bleed air heat exchanger may be located upstream from a cooled cooling air heat exchanger, with both heat exchangers located in an outer cowling or nacelle surrounding the turbomachine. The compressor bleed air heat exchanger may receive relatively cool air from an annular outer duct (which may be a bypass duct or thermal management system duct), and the heated cooling air discharging from the compressor bleed air heat exchanger may be refreshed with relatively cool air from the annular outer duct, thereby allowing the cooled cooling air heat exchanger to receive relatively cooler air having been refreshed with air from the annular outer duct rather than being dependent on the heated air discharging from the compressor bleed air heat exchanger.

As yet another example, a compressor bleed air heat exchanger may be located upstream from a cooled cooling air heat exchanger, with both heat exchangers located in annular inner duct (which may be a fan duct or a bypass duct). The compressor bleed air heat exchanger may receive relatively cool air from an annular inner duct (which may be a bypass duct or thermal management system duct), and the heated cooling air discharging from the compressor bleed air heat exchanger may be refreshed with relatively cool air from the annular outer duct, thereby allowing the cooled cooling air heat exchanger to receive relatively cooler air having been refreshed with air from the annular outer duct rather than being dependent on the heated air discharging from the compressor bleed air heat exchanger.

As yet another example, a compressor bleed air heat exchanger may be located upstream from a cooled cooling air heat exchanger, with both heat exchangers located in an annular outer duct (which may be a bypass duct or thermal management system duct). The compressor bleed air heat exchanger may receive relatively cool air from the annular outer duct, and the heated cooling air discharging from the compressor bleed air heat exchanger may be refreshed with relatively cool air from the annular inner duct, thereby allowing the cooled cooling air heat exchanger to receive relatively cooler air from the annular inner duct rather than being dependent on heated air discharging from the compressor bleed air heat exchanger.

In exemplary embodiments, the presently disclosed heat management systems may include a control system configured to receive a temperature input from a temperature sensor and to output a control command the hatch responsive to the temperature input from the temperature sensor. The control command may be configured to cause the hatch to direct a fluid stream from a second duct to a first duct (and/or to interrupt or modulate such fluid stream), for example, responsive to a comparison of the temperature input to a threshold temperature.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third", and so forth, as well as the terms "primary", "secondary", and "tertiary", and so forth, may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Exemplary embodiments of the present disclosure will now be described in further detail. FIGS. 1A and 1B, 2A and 2B, 3A and 3B, and 4A and 4B schematically show exemplary embodiments of a turbomachine 100 that includes a heat management system 200. It will be appreciated that the turbomachines 100 shown in FIGS. 1A and 1B, 2A and 2B, 3A and 3B, and 4A and 4B are provided by way of example only and not to be limiting. Numerous other turbomachine 100 configurations are contemplated, all of which are within the scope of the present disclosure. The turbomachine 100 may be configured for powering an aircraft (not shown) in flight. The turbomachine 100 is axisymmetrical about a longitudinal or axial centerline axis 102 and may be suitably mounted to the wing or fuselage of the aircraft as desired.

FIGS. 1A, 2A, 3A, and 4A show exemplary embodiments of a turbomachine 100 that includes a heat management system 200. FIGS. 1B, 2B, 3B, and 4B respectively show cross-sectional views of the exemplary turbomachines 100 depicted in FIGS. 1A, 2A, 3A, and 4A. As shown, an exemplary turbomachine 100 includes, in serial flow relationship, a fan module 104, a compressor section 106, a combustion section 108, a turbine section 110, and an exhaust section 112. Although not depicted, the compressor section may include, by way of example, a high-pressure compressor section, or a low-pressure compressor section followed by a high-pressure compressor section, and a turbine section 110 may include, by way of example, a high-pressure turbine section 110 followed by a low-pressure turbine. Ambient air 114 enters the turbomachine 100 through its intake and is pressurized in turn by the fan module 104 and compressor section 106 and mixed with fuel in the combustion section 108 for generating hot combustion gases 116. Energy is extracted from the combustion gases 116 in the turbine section 110 for powering the fan module 104 and compressor section 106, with the combustion gases 116 being discharged through the exhaust section 112. The fan module 104 is joined to the turbine section 110 by a first spool or drive shaft 118.

Figure 1B:
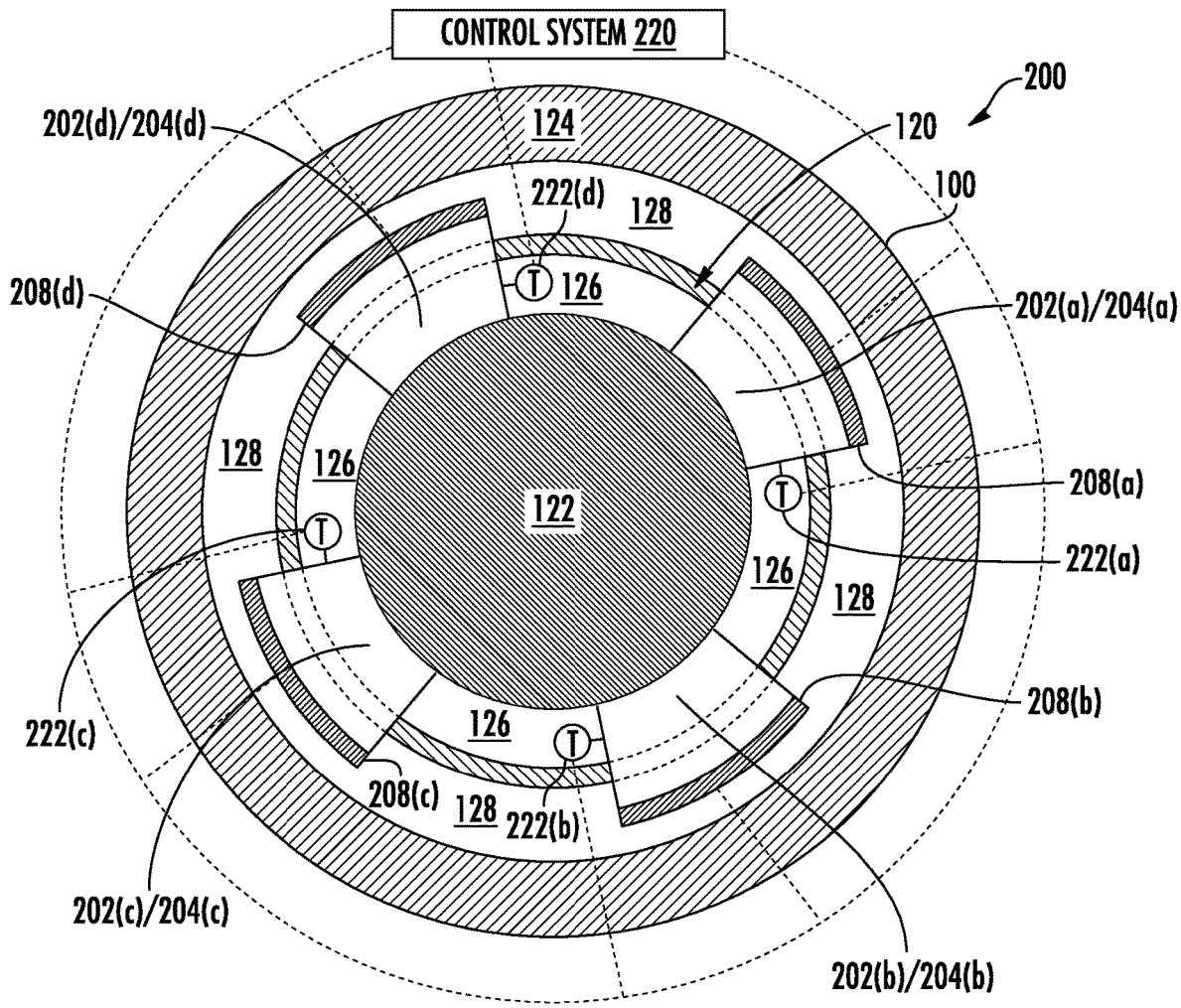
FIG. 1B schematically depicts a cross-sectional view of the exemplary turbomachine of FIG. 1A.

An annular first casing 120 surrounds the core engine 122, which includes the compressor section 106, the combustion section 108, and the turbine section 110, and extends aft past the turbine section 110. An annular second casing 124 is spaced radially outwardly or outboard from the first casing 120 concentric therewith. In an exemplary embodiment, the second casing 124 may be a nacelle. As shown in FIGS. 1A and 1B, the core engine 122 and the first casing 120 define radially therebetween an annular inner or first duct 126 which coaxially surrounds the core engine 122. In some embodiments, the annular inner or first duct 126 may be a thermal management duct. The first duct 126 extends axially in length from its forward inlet end behind the fan module 104, around and bypassing the core engine 122. The first casing 120 and the second casing 124 define radially therebetween an annular outer or second duct 128 which coaxially surrounds the fan module 104 and the first duct 126, and which is in flow communication with the radially outer tip of the fan module 104. The second duct 128 (e.g., an outer bypass duct) extends axially in length from its inlet end directly behind the fan module 104 to its outlet end disposed axially aft of the core engine 122 at the aft end of the first duct 126.

Figure 2A:
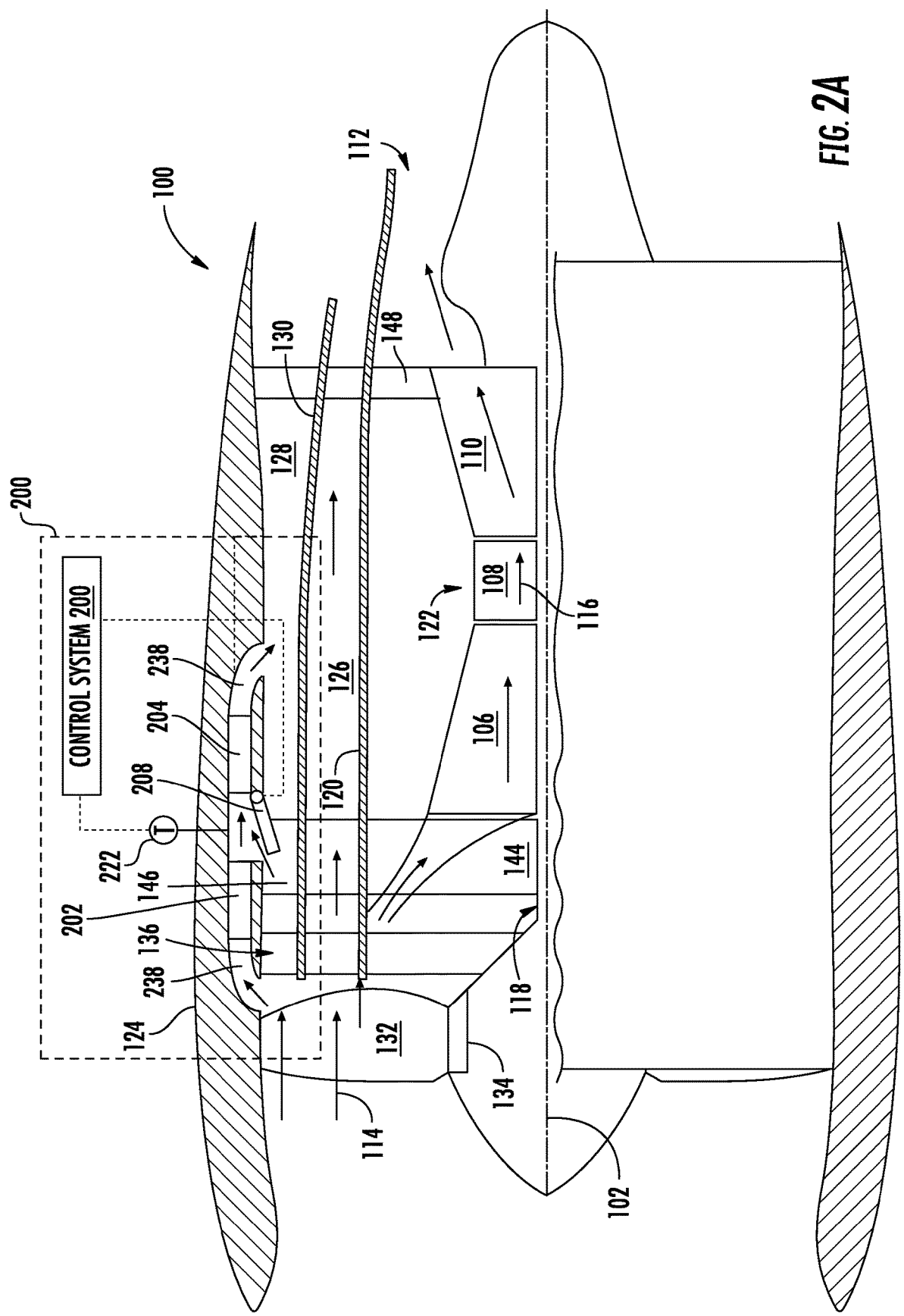
FIG. 2A schematically depicts a perspective cut-away view of an exemplary turbomachine that includes one embodiment of a heat management system.
Figure 2B:
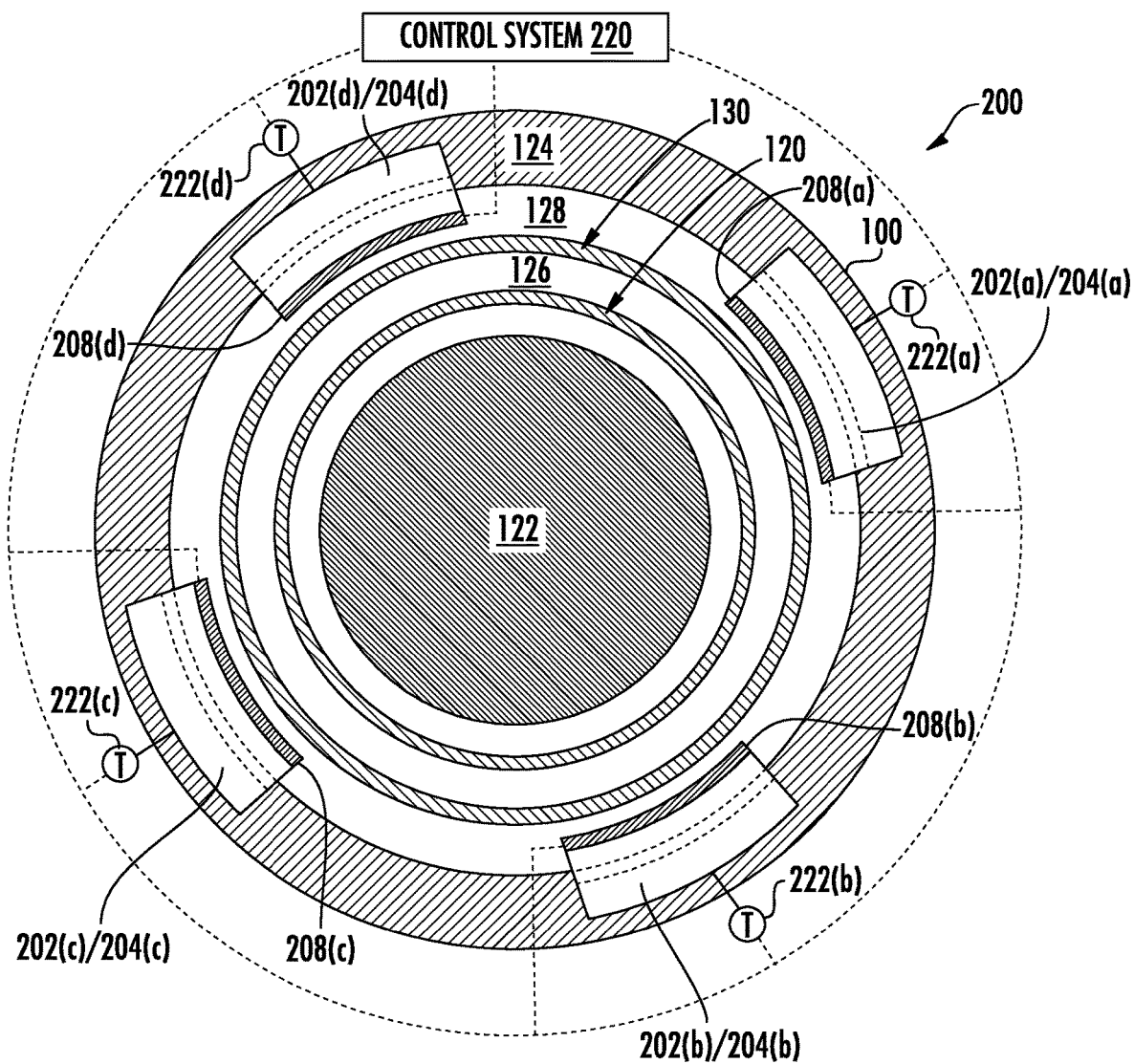
FIG. 2B schematically depicts a cross-sectional view of the exemplary turbomachine of FIG. 2A.
Figure 3A:
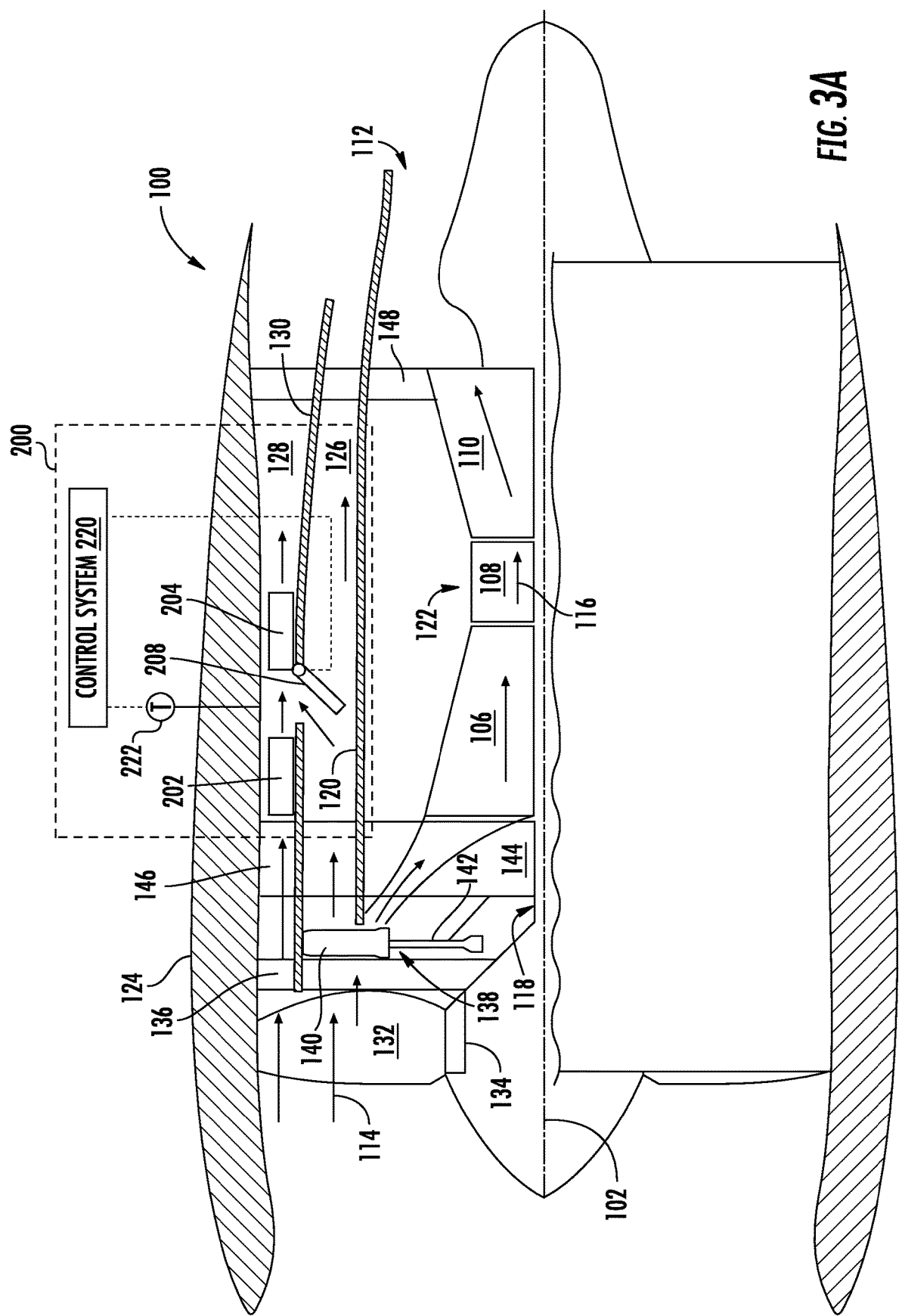
FIG. 3A schematically depicts a perspective cut-away view of an exemplary turbomachine that includes one embodiment of a heat management system.
Figure 3B:
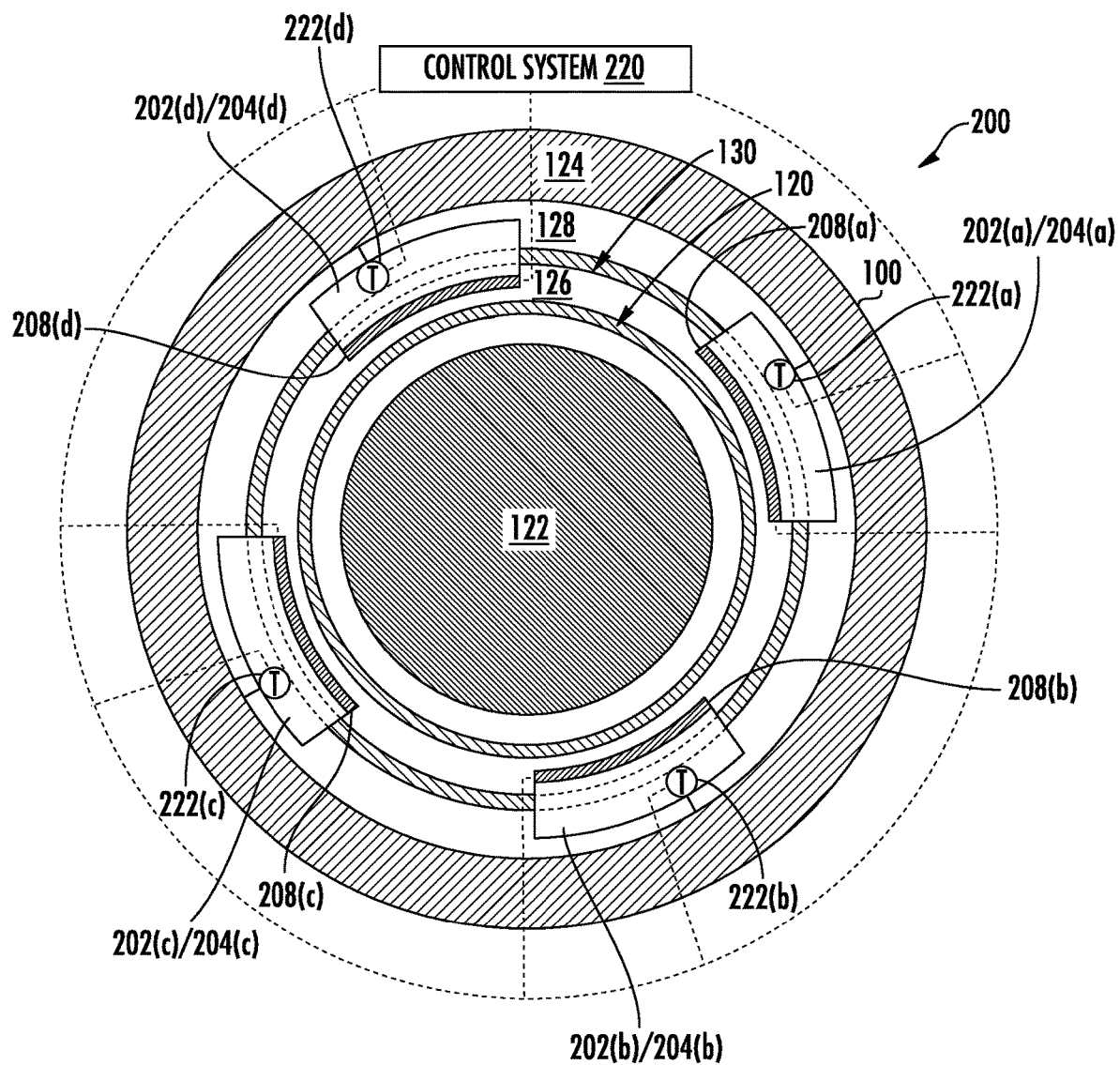
FIG. 3B schematically depicts a cross-sectional view of the exemplary turbomachine of FIG. 3A.
Figure 4A:
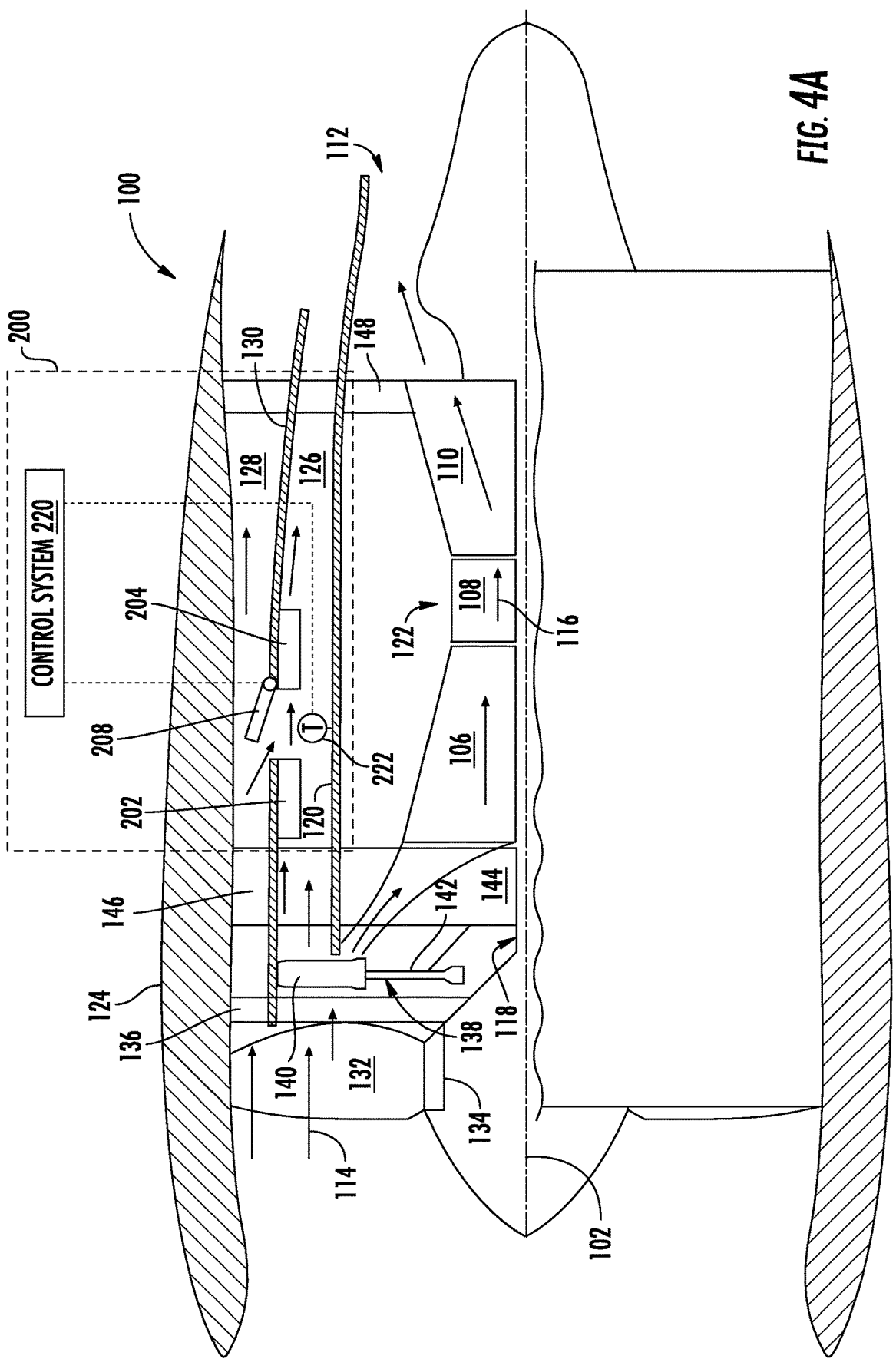
FIG. 4A schematically depicts a perspective cut-away view of an exemplary turbomachine that includes one embodiment of a heat management system.

In some embodiments, such as shown in FIGS. 2A and 2B, 3A and 3B, and 4A and 4B, an annular third casing 130 may be located annularly between the first casing 120 and the second casing 124 and concentric therewith. Additionally, in some embodiments, such as shown in FIGS. 3A and 4A, the turbomachine 100 may include a fan module 104 that is a multi-stage fan module, as described below.

As shown in FIGS. 1A and 1B, 2A and 2B, 3A and 3B, and 4A and 4C, the first casing 120 and the third casings 130 define radially therebetween an annular inner or first duct 126 which coaxially surrounds the core engine 122. The first duct 126 extends axially in length from its forward inlet end behind the fan module 104, around and bypassing the core engine 122. The second casing 124 and the third casings 130 define radially therebetween an annular outer or second duct 128 which coaxially surrounds the fan module 104 and the first duct 126 in flow communication with the radially outer tip of the fan module 104. The second duct 128 extends axially in length from its inlet end directly behind the fan module 104 to its outlet end disposed axially aft of the core engine 122 and turbine section 110 at the aft end of the first duct 126. In the embodiments shown in FIGS. 1A and 1B, 2A and 2B, 3A and 3B, and 4A and 4C, the first duct 126 may be an inner bypass duct, and the second duct 128 may be an outer bypass duct.

The first duct 126 and the second duct 128 are concentric with each other and extend from the fan module 104 in a long duct configuration over the majority of the axial length of the turbomachine 100 to bypass the inner core engine 122 with two concentric streams of airflow. The fan module 104 includes a first fan blade assembly 132 that includes a single stage or row of large first fan rotor blades extending radially outwardly from a supporting first rotor disk 134. In exemplary embodiments, the first fan blade assembly 132 includes rotor blades that are large in diameter and extend radially outwardly across the radial span of the first duct 126 disposed directly there behind, and additionally extends radially outwardly over the radial span of the inlet end of the second duct 128 to terminate in a small radial spacing or gap just below the inner surface of the second casing 124 surrounding the fan module 104. The fan module 104 may also include a row of fixed outlet guide vanes (OGVs) 136 disposed aft of the first fan blade assembly 132. The OGVs 136 may have suitable airfoil configurations for deswirling the pressurized ambient air 114 discharged from the radially outer tip portion of the first fan blade assembly 132. When the fan module 104 is a multi-stage fan module, the fan module 104 may include a second fan blade assembly 138. The second fan blade assembly 138, when present, may include a single stage or row of small second fan rotor blades 140 extending radially outwardly from a supporting second rotor disk 142 and is disposed axially between the first fan blade assembly 132 and the first duct 126. In exemplary embodiments, the small diameter second fan blade assembly 138, when present, may extend radially outwardly across both the inlet end of the core engine 122 leading to the compressor section 106 and the inlet end of the first duct 126 to terminate in a small clearance or gap inside the inlet end of the surrounding third casing 130. The first rotor disk 134 may be fixedly joined to the first shaft 118, and the second rotor disk 142 may be fixedly joined to the first shaft 118 or to a second shaft (not shown). In this way, the fan module 104 may include a large single stage first fan blade assembly 132 directly followed in flow communication by the small single stage second fan blade assembly 138, which may be independently or commonly joined to and driven by the turbine section 110. An annular fan frame 144 is disposed axially between the fan module 104 (or the second fan blade assembly 138, when present) and the compressor section 106, and may include a row of fan struts 146 extending radially outwardly from the central hub and through both the first and second ducts 126, 128 near the inlet ends thereof and directly aft of the OGVs 136. An annular rear frame 148 includes a corresponding row of rear struts which extend radially through the forward end of the exhaust section 112 for supporting the aft ends of the drive shaft(s).

Now referring to FIG. 5, an exemplary heat management system 200 will be described. An exemplary heat management system 200 includes a first heat exchanger 202, a second heat exchanger 204. The first heat exchanger 202 may be configured and arranged to receive a first fluid stream 206(a)(e.g., cooling air) from a first duct 126, and the second heat exchanger 204 may be configured and arranged to receive the first fluid stream 206(b) after discharging from the first heat exchanger 202. In the embodiment shown in FIG. 5, at least a portion of the first heat exchanger 202 and/or at least a portion of the second heat exchanger 204 may be disposed within the first duct 126. Additionally, or in the alternative, in other embodiments at least a portion of the first heat exchanger 202 and/or at least a portion of the second heat exchanger 204 may be disposed within the second duct 128.

A hatch 208 may be configured to provide fluid communication from a second duct 128 to the first duct 126 so as to introduce a second fluid stream 210(b) (e.g., cooling air) from the second duct 128 to the first duct 126. The second heat exchanger 204 may also receive the second fluid stream 210(b) introduced through the hatch 208. For example, the first fluid stream 206(a) discharging from the first heat exchanger 202 may mix with the second fluid stream 210(b) introduced through the hatch 208.

Alternatively, the first heat exchanger 202 may be configured and arranged to receive a first fluid stream 206(a) from the second duct 128, and the hatch 208 may be configured to provide fluid communication from the first duct 126 to the second duct 128 so as to introduce a second fluid stream 210(b) from the first duct to the second duct 128. The second heat exchanger 204 may also receive the second fluid stream 210(b) introduced through the hatch 208. For example, the first fluid stream 206(b) discharging from the first heat exchanger 202 may mix with the second fluid stream 210(b) introduced through the hatch 208.

The first heat exchanger 202 includes a first heat exchanger inlet 212 configured and arranged to receive the fluid stream 206(a) and a first heat exchanger outlet 214 configured and arranged to discharge the first fluid stream 206(b). The second heat exchanger 204 includes a second heat exchanger inlet 216 configured and arranged to receive the first fluid stream 206(b) after discharging from the first heat exchanger 202 and/or the second fluid stream 210(b) introduced through the hatch 208. The second heat exchanger 204 includes a second heat exchanger outlet 218 configured and arranged to discharge the first fluid stream 206(c) and/or the second fluid stream 210(b) introduced through the hatch 208.

The hatch 208 may provide fluid communication from the second duct 128 to the first duct 126 at any desired location. As shown, the hatch 208 provides fluid communication from the second duct 128 to the first duct 126 downstream from the first heat exchanger 202 such that the hatch 208 introduces the second fluid stream 210(b) from the second duct 128 to the second heat exchanger inlet 216. Additionally, or in the alternative, a hatch 208 may be configured and arranged so as to provide fluid communication from the second duct 128 to the first duct 126 upstream from the first heat exchanger 202, for example, such that the second fluid stream 210(b) introduced through the hatch 208 may flow through the first heat exchanger 202.

It is contemplated that a heat management system 200 may include a plurality of heat exchangers 202, 204 and a hatch 208 located at a variety of different positions within a turbomachine 100, some of which are depicted by way of example in FIGS. 1A and 1B, 2A and 2B, 3A and 3B, and 4A and 4B. Additionally, it is contemplated that a heat management system 200 may include a plurality of heat exchangers 202, 204 and corresponding hatches 208 disposed radially around one or more of the respective ducts 126, 128 and/or casings 120, 124, 130 of a turbomachine 100. Further in addition, or in the alternative, some embodiments may include a third heat exchanger (not shown) located downstream from the second heat exchanger 204, and a second hatch (not shown) located between the second heat exchanger 204 and the third heat exchanger. A plurality of third heat exchangers and second hatches may be disposed radially around one or more of the respective ducts 126, 128 and/or casings 120, 124, 130 of a turbomachine 100.

A heat management array may include one or more hatches 208 disposed radially around one or more of the respective ducts 126, 128 and/or casings 120, 124, 130 of a turbomachine 100. A heat management array may additionally include one or more first heat exchangers 202 disposed upstream of the one or more hatches 208, and/or one or more second heat exchangers 204 disposed downstream of the one or more hatches 208. It will be appreciated that a heat management system 200 may include any number of heat management arrays, such as a plurality of heat management arrays in serial flow arrangement. For example, a heat management system 200 may include, in serial flow relationship, one or more first heat exchangers 202, one or more first hatches 208 downstream from the one or more first heat exchangers 202, one or more second heat exchangers 204 downstream from the one or more first hatches 208, one or more second hatches 208 downstream (not shown) from the one or more second heat exchangers 204, and one or more third heat exchangers (not shown) downstream from the one or more second hatches 208.

An exemplary heat management system 200 may include a plurality of first heat exchangers 202 disposed radially about the first duct 126, and the plurality of first heat exchangers 202 may be respectively configured and arranged to receive a respective portion of the first fluid stream 206 from the first duct 126. Additionally, an exemplary heat management system 200 may include a plurality of second heat exchangers 204 disposed radially about the first duct 126 downstream from the plurality of first heat exchangers 202. The plurality of second heat exchangers 204 may be respectively configured and arranged to receive a respective portion of the first fluid stream 206(b) after discharging from respective ones of the plurality of first heat exchangers 202. Further, an exemplary heat management system 200 may include a plurality of hatches 208 respectively providing fluid communication from the second duct 128 to the first duct 126 downstream from the plurality of first heat exchangers 202. The plurality of hatches 208 may be respectively configured and arranged to introduce a respective portion of the second fluid stream 210(b) from the second duct 128 to the first duct 126.

By way of example, as shown in FIGS. 1B, 2B, 3B, and 4B, an exemplary heat management system 200 is depicted with four (4) sets of first and second heat exchangers 202, 204 and corresponding hatches 208. A heat management system 200 may include a first array of first heat exchangers 202, a second array of second heat exchangers 204, and a third array of hatches 208. The first array of first heat exchangers 202 may include a primary first heat exchanger 202(a), a secondary first heat exchanger 202(b), a tertiary first heat exchanger 202(c), and a quaternary first heat exchanger 202(d). The second array of second heat exchangers 204 may include a primary second heat exchanger 204(a), a secondary second heat exchanger 204(b), a tertiary second heat exchanger 204(c), and a quaternary second heat exchanger 204(d). The third array of hatches 208 may include a primary hatch 208(a), a secondary hatch 208(b), a tertiary hatch 208(c), and a quaternary hatch 208(d). However, it will be appreciated that the embodiments depicted are provided by way of example only and not to be limiting, and that any number of sets of first and second heat exchangers 202, 204 and corresponding hatches 208, and or arrays thereof, may be provided without departing from the scope of the present disclosure.

In some embodiments, as shown in FIGS. 1A and 1B, at least a portion of the first heat exchanger 202 and/or at least a portion of the second heat exchanger 204 may be disposed within a first duct 126. The first duct 126 may be a thermal management duct and the first fluid stream 206(a) may include thermal management air. The second duct 128 may a bypass duct and the second fluid stream 210(a) may include bypass air.

In other embodiments, as shown in FIGS. 2A and 2B, at least a portion of the first heat exchanger 202 and/or at least a portion of the second heat exchanger 204 may be located within the body of a casing, such as the second casing 124. The first duct 126 may be a thermal management duct traversing through the casing, and the first fluid stream 206(a) may include thermal management air. The second duct 128 may a bypass duct and the second fluid stream 210(a) may include bypass air.

Figure 4B:
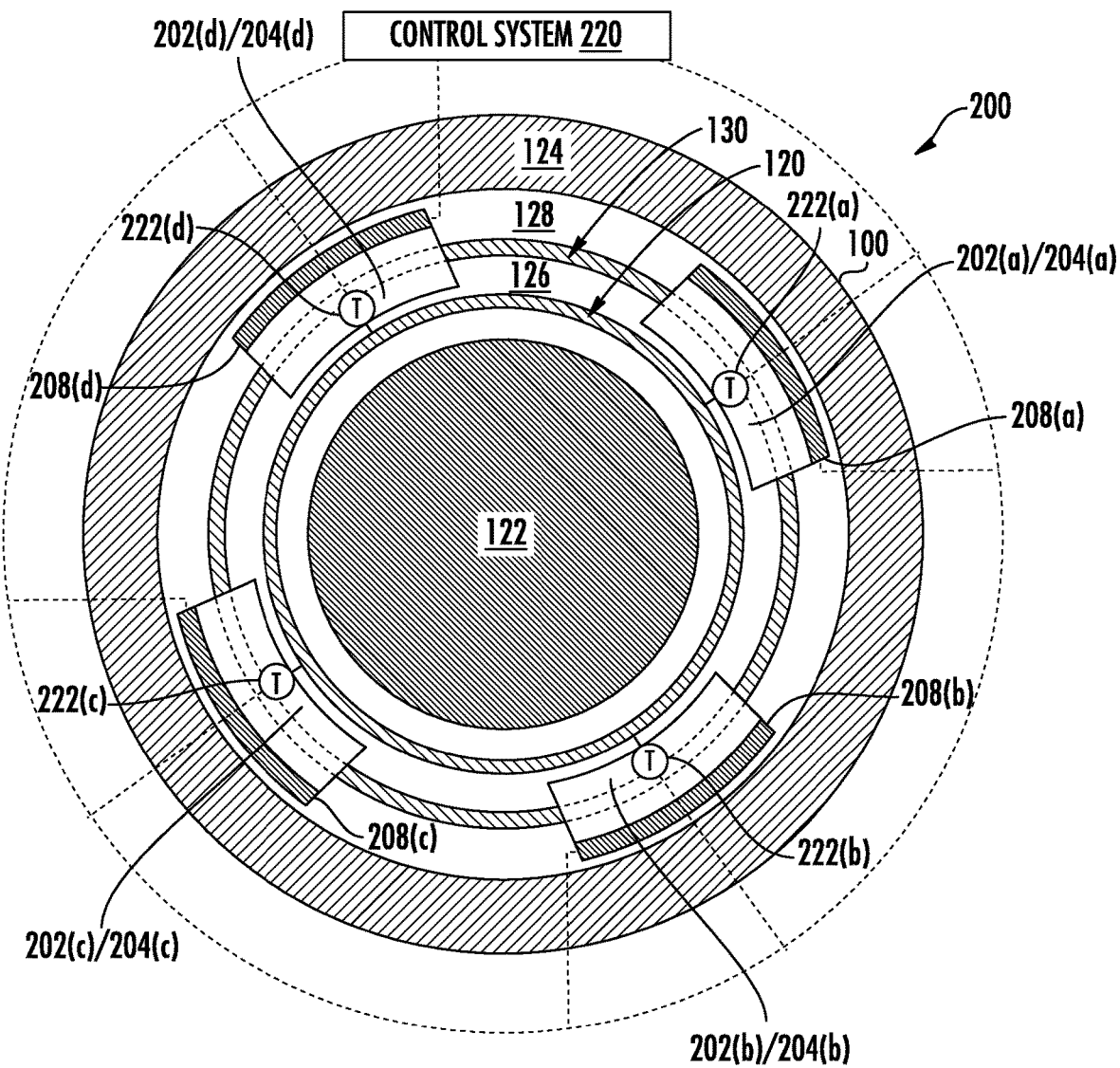
FIG. 4B schematically depicts a cross-sectional view of the exemplary turbomachine of FIG. 4A.

In still other embodiments, as shown in in FIGS. 3A and 3B, the first duct 126 may be an annular outer bypass duct and the first fluid stream 206(a) may include outer bypass air, and the second duct 128 may be an annular inner bypass duct and the second fluid stream 210(a) may include inner bypass air. Alternatively, as shown in FIGS. 4A and 4B, the first duct 126 may be an annular inner bypass duct and the first fluid stream 206(a) may include inner bypass air, and the second duct 128 may be an annular outer bypass duct of the turbomachine 100 and the second fluid stream 210(a) may include outer bypass air.

In some embodiments, such as when at least a portion of the first heat exchanger 202 and/or the second heat exchanger 204 are located within the body of a casing (e.g., as shown in FIGS. 2A and 2B), the heat management system 200 may optionally include an inlet duct 236 configured to provide fluid communication to the inlet of the first heat exchanger 202, such as from an upstream side of the second duct 128. The heat management system 200 may additionally or alternatively optionally include an outlet duct 238 configured to provide fluid communication from the outlet of the second heat exchanger 204, such as to a downstream side of the second duct 128. In some embodiments, the inlet duct 236 and/or the outlet duct 238 may include a hatch 208, which may be configured as described herein, including, for example, a door as described with reference to FIGS. 6A-6C and/or a scoop as described with reference to FIGS. 7A and 7B.

Figure 5:
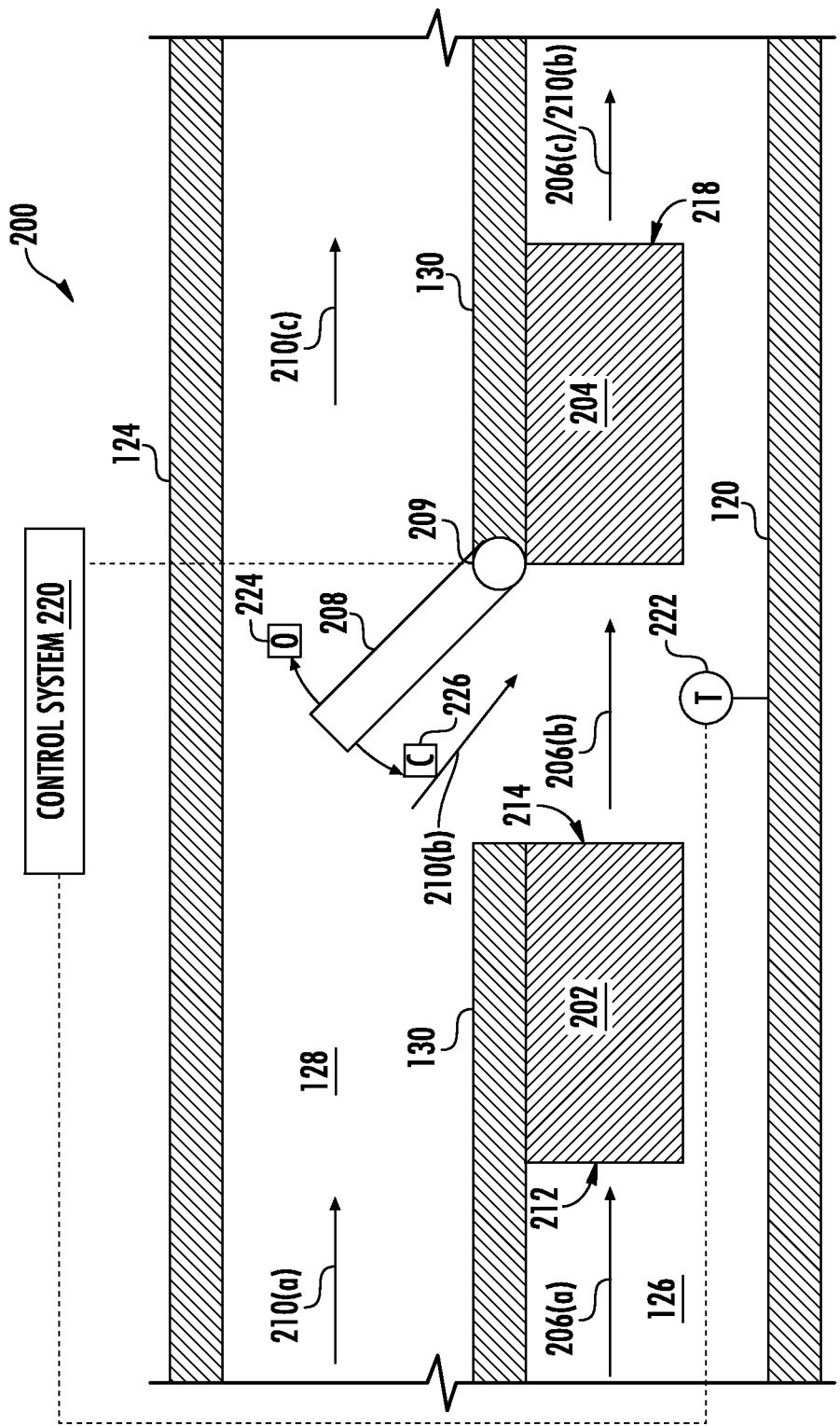
FIG. 5 schematically depicts features of an exemplary heat management system which may be included in the exemplary turbomachines of FIGS. 1A and 1B, 2A and 2B, 3A and 3B, and/or 4A and 4B.

Referring still to FIG. 5, in some embodiments, the hatch 208 may have a fixed position. Alternatively, the hatch 208 may have an adjustable position such that the volume of the second fluid stream 210(b) introduced into the first duct 126 from the second duct 128 may be adjusted by changing the position of the hatch 208. The position of the hatch 208 may be changed using an articulation device 209, such as a hinge, a piston, a lever, or the like. In some embodiments, a heat management system 200 may include a control system 220. The control system 220 may be configured to control operation of the hatch 208. The control system 220 may be operably coupled to a temperature sensor 222 and the hatch 208. The control system 220 may be configured to receive a temperature input from the temperature sensor 222 and to output a control command to the hatch 208 responsive to the temperature input from the temperature sensor 222. The control command may be configured to cause the hatch 208 to move to an open position 224 when the temperature input corresponds to a temperature of the first fluid stream 206(b) equal to or greater than a threshold temperature. The hatch 208, when at the open position 224, may direct the second fluid stream 210(b) from the second duct 128 to the first duct 126.

The temperature sensor 222 may be configured and arranged to ascertain the temperature of the first fluid stream 206(a), and may be located at any desired position, such as downstream from the first heat exchanger 202, upstream from the first heat exchanger 202, or downstream from the second heat exchanger 204. Additionally, in some embodiments, multiple temperature sensors may be provided, which may be configured and arranged to ascertain the temperature of the first fluid stream 206 at multiple radial positions around the first duct 126 and/or at multiple axial positions along the first duct 126. Additionally, or in the alternative, temperature sensors 222 may be configured and arranged to ascertain the temperature of any other desired fluid stream associated with the heat management system 200.

A control command may be additionally or alternatively configured to cause the hatch 208 to move to a closed position 226 when the temperature input corresponds to a temperature of the first fluid stream 206(a) less than the threshold temperature. The hatch 208, when at the closed position 226, may interrupt the second fluid stream 210(b) flowing from the second duct 128 to the first duct 126. Additionally, or in the alternative, a control command may be configured to cause the hatch 208 to move between the open position 224 and the closed position 226 based at least in part on the temperature input. In this way, the hatch 208 may modulate a flow of the second fluid stream 210(b) from the second duct 128 to the first duct 126.

Figure 6A:
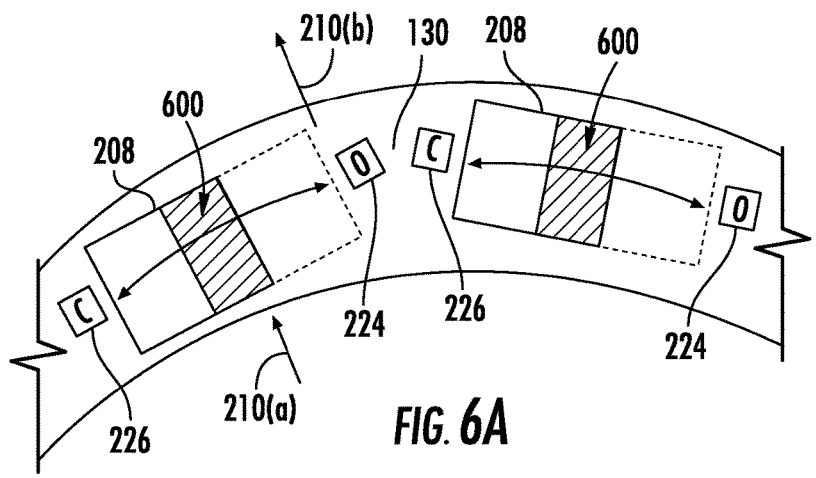
FIGS. 6A-6C schematically depict features of an exemplary hatch which may be included in an exemplary heat management system of a turbomachine.
Figure 6B:
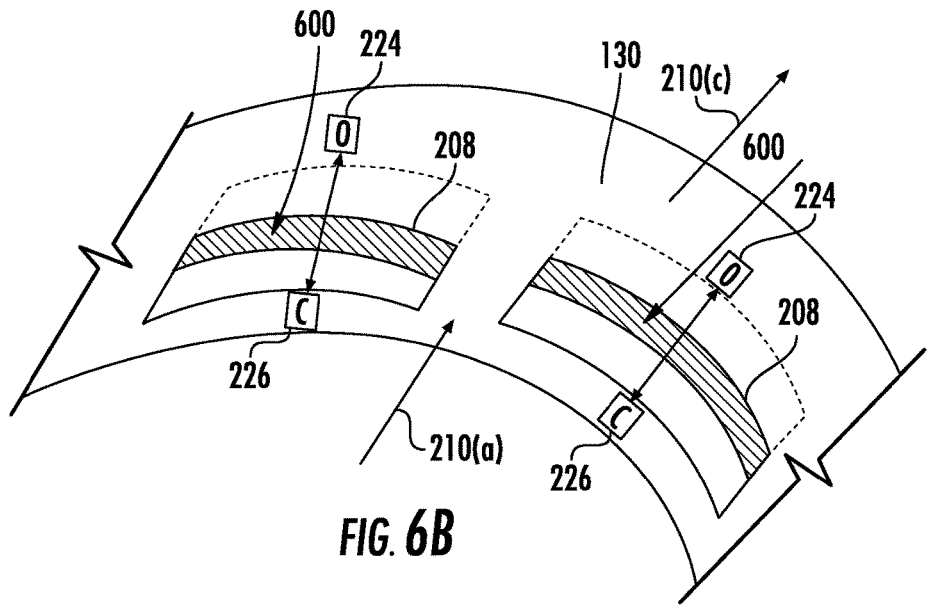
Figure 6C:
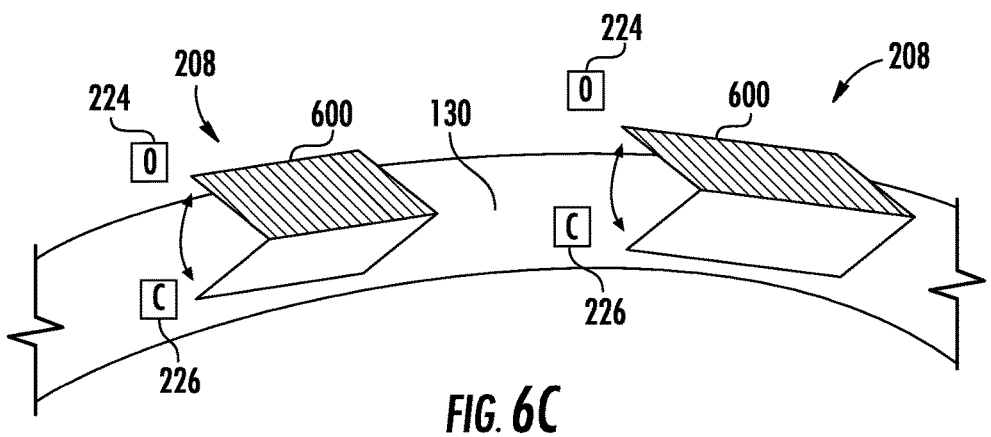
Figure 7A:
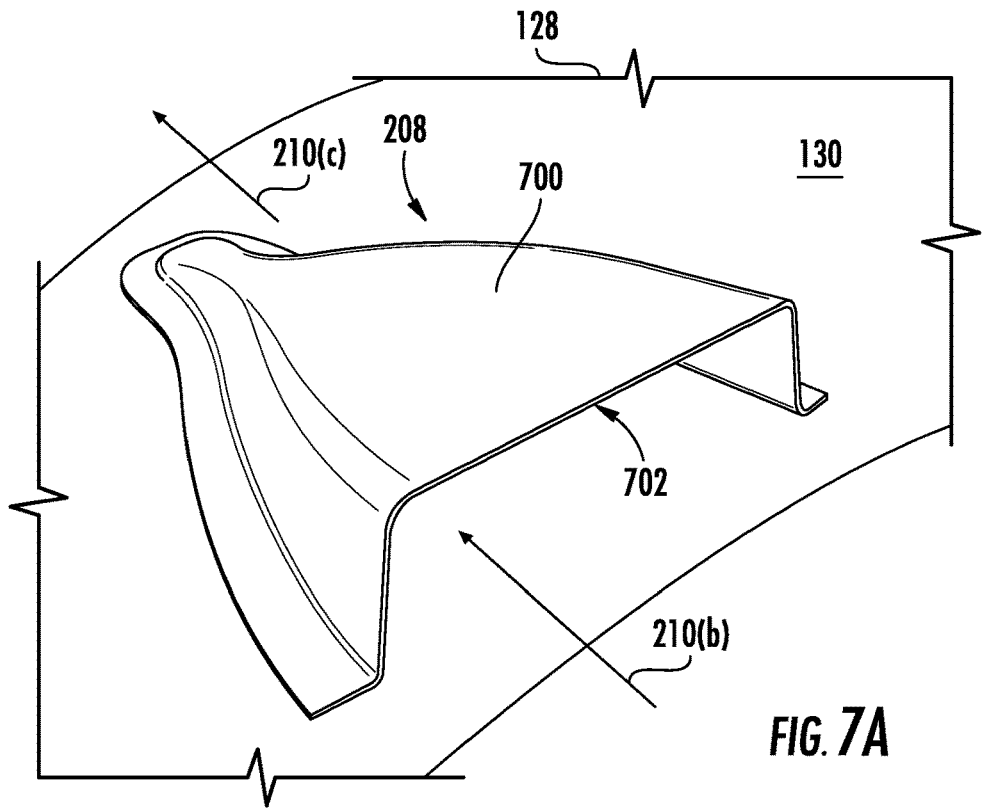
FIGS. 7A and 7B schematically depict further features of an exemplary hatch which may be additionally or alternatively included in an exemplary heat management system of a turbomachine.
Figure 7B:
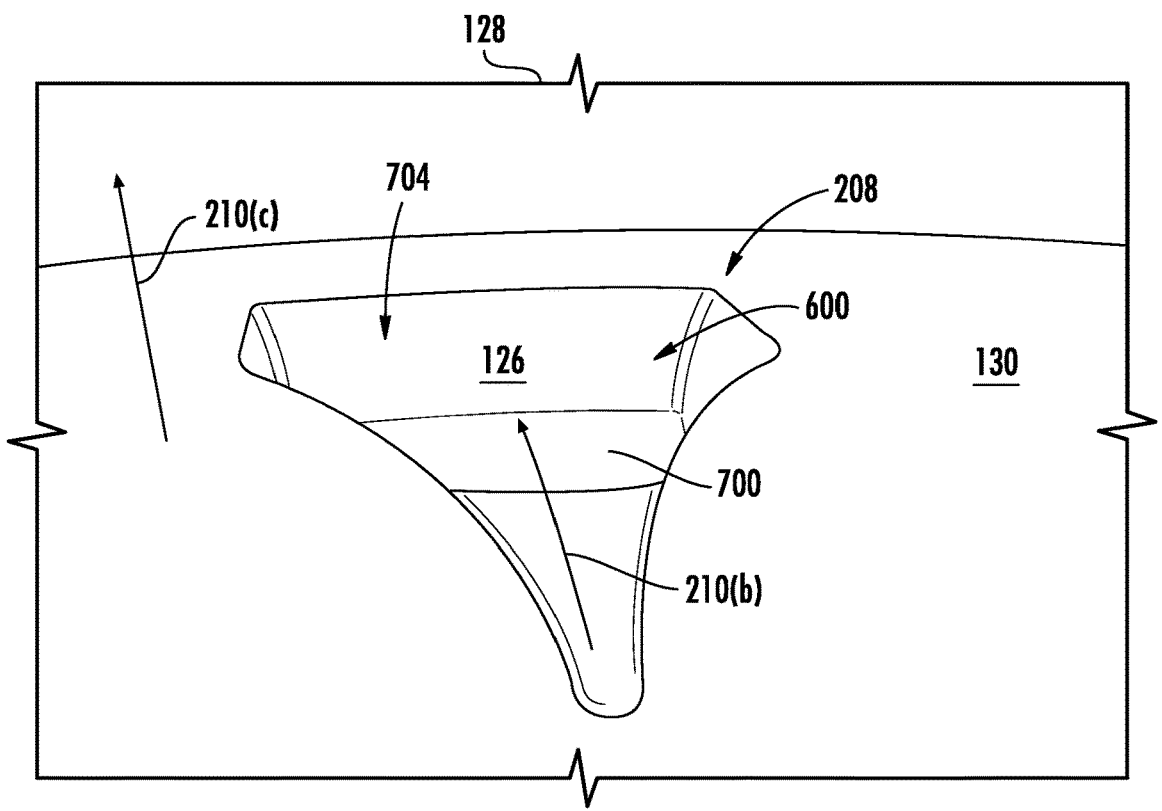

Now referring to FIGS. 6A-6C, and 7A and 7B, an exemplary hatch 208 may include a door 600 and/or an air scoop 700, and an exemplary heat management system 200 may include a plurality of hatches 208, and the plurality of hatches 208 may respectively include one or more doors 600 and/or one or more air scoops 700. The hatch 208 may additionally include a hatchway 602 defined at least in part by the perimeter of the hatch 208 and through which the second fluid stream 210(b) may flow from the second duct 128 to the first duct 126. In some embodiments, the hatch 208 may include both an air scoop 700 and a door 600, such as shown in FIG. 7B. Alternatively, a hatch 208 may include an air scoop 700 without a door 600, or a door 600 without an air scoop 700.

As shown in FIGS. 6A-6C, a door 600 may be movable between an open position 224 and a closed position 226, and with the door 600 positioned at the open position 224, the hatch 208 may provide fluid communication from the second duct 128 to the first duct 126 such as through the hatchway 602. With the door 600 positioned at the closed position 226, the door 600 may interrupt fluid communication from the second duct 128 to the first duct 126. In exemplary embodiments, the door 600 may be movable among a plurality of open positions 224 so as to modulate the second fluid stream 210(b) from the second duct 128 flowing to the second heat exchanger inlet 216.

As shown in FIG. 6A, a door 600 may articulate circumferentially between the open position 224 and the closed position 226. Alternatively, as shown in FIG. 6B, a door 600 may articulate longitudinally between the open position 224 and the closed position 226. Further in the alternative, as shown in FIG. 6C, a door 600 may articulate radially between the open position 224 and the closed position 226.

In some embodiments, such as shown in FIG. 6C, at least a portion of the door 600 may project into the second duct 128 at the open position 224. For example, the door 600 may articulate radially into the second duct 128. Alternatively, the door 600 may articulate radially into the first duct 126, such that at least a portion of the door 600 may project into the first duct 126 at the open position 224.

As shown in FIGS. 7A and 7B, the hatch 208 may include an air scoop 700. As shown in FIG. 7A, the air scoop 700 may include a raised inlet 702 extending into the second duct 128 (e.g., upward from the third casing 130). Additionally, or in the alternative, as shown in FIG. 7B, the air scoop 700 may include a submerged inlet 704. The submerged inlet 704 may extend into the first duct 126 (e.g., downward from the third casing 130). The air scoop 700 may include a hatchway 602 defined at least in part by the perimeter of the raised inlet 702 (FIG. 7A) or the perimeter of the submerged inlet 704 (FIG. 7B).

In some embodiments, a plurality of hatches 208 (e.g., a plurality of doors 600 and/or a plurality of air scoops 700) may be disposed radially, such as in an array, around one or more of the respective ducts 126, 128 and/or casings 120, 124, 130 of a turbomachine 100. For example, referring to FIGS. 1B, 2B, 3B, and 4B, a heat management system 200 may include an array of hatches 208 may include a primary hatch 208(a), a secondary hatch 208(b), a tertiary hatch 208(c), and a quaternary hatch 208(d). Additionally, or in the alternative, a plurality of hatches 208 (e.g., a plurality of doors 600 and/or a plurality of air scoops 700) may be disposed axially, such as in a serial flow relationship, along one or more of the respective ducts 126, 128 and/or casings 120, 124, 130 of a turbomachine 100. The hatches 208 may have varying sizes, positions, ranges of articulation, and so forth, for example, to account for circumferentially and/or axially varying temperatures, flow rates, etc. and/or to account for circumferentially and/or axially varying heat management requirements.

A heat management system 200 may additionally include an array of temperature sensors 222 respectively corresponding to the array of hatches 208. The array of temperature sensors 222 may include a first temperature sensor 222(a), a second temperature sensor 222(b), a third temperature sensor 222(c), and a fourth temperature sensor 222(d). However, it will be appreciated that the embodiments depicted are provided by way of example only and not to be limiting, and that any number of sets of temperature sensors 222 may be provided without departing from the scope of the present disclosure.

Control commands may be configured to cause a plurality of hatches 208 to move independently from one another, for example, to account for circumferentially and/or axially varying temperatures, flow rates, etc. and/or to account for circumferentially and/or axially varying heat management requirements. A first control command may move a first hatch 208(*a*) to a first position and a second control command may move a second hatch 208(*b*) to a second position, and the first position may differ from the second position. The first control command may be based at least in part on an input from a first temperature sensor 222(*a*), and/or the second control command may be based at least in part on an input from a second temperature sensor 222(*b*).

A first control command may be configured to move a first hatch 208(*a*) to an open position 224 when a first temperature input from a first temperature sensor 222(*a*) corresponds to a temperature of the first fluid stream 206(*b*) axially proximal to the first hatch 208(*a*) equal to or greater than a first threshold temperature. The first hatch 208(*a*), when at the open position 224, may direct the second fluid stream 210(*b*) axially proximal to the first hatch 208(*a*) from the second duct 128 to the first duct 126. Additionally, or in the alternative, a first control command may be configured to move a first hatch 208(*a*) to a closed position 226 when a first temperature input from a first temperature sensor 222(*a*) corresponds to a temperature of the first fluid stream 206(*a*) axially proximal to the first hatch 208(*a*) less than a first threshold temperature. The first hatch 208(*a*), when at the closed position 226, may interrupt the second fluid stream 210(*b*) flowing from the second duct 128 to the first duct 126 axially proximal to the first hatch 208(*a*). Further in addition or in the alternative, a first control command may be configured to cause the first hatch 208(*a*) to move between the open position 224 and the closed position 226 based at least in part on the temperature input from the first temperature sensor 222(*a*). In this way, the first hatch 208(*a*) may modulate a flow of the second fluid stream 210(*b*) from the second duct 128 to the first duct 126 axially proximal to the first hatch 208(*a*).

A second control command may be configured to move a second hatch 208(*b*) to an open position 224 when a second temperature input from a second temperature sensor 222(*b*) corresponds to a temperature of the first fluid stream 206(*b*) axially proximal to the second hatch 208(*a*) equal to or greater than a second threshold temperature. The second hatch 208(*b*), when at the open position 224, may direct the second fluid stream 210(*b*) axially proximal to the second hatch 208(*b*) from the second duct 128 to the first duct 126. Additionally, or in the alternative, a second control command may be configured to move a second hatch 208(*b*) to a closed position 226 when a second temperature input from a second temperature sensor 222(*b*) corresponds to a temperature of the first fluid stream 206(*a*) axially proximal to the second hatch 208(*b*) less than a second threshold temperature. The second hatch 208(*b*), when at the closed position 226, may interrupt the second fluid stream 210(*b*) flowing from the second duct 128 to the first duct 126 axially proximal to the second hatch 208(*b*). Further in addition or in the alternative, a second control command may be configured to cause the second hatch 208(*b*) to move between the open position 224 and the closed position 226 based at least in part on the temperature input from the second temperature sensor 222(*b*). In this way, the second hatch 208(*b*) may modulate a flow of the second fluid stream 210(*b*) from the second duct 128 to the first duct 126 axially proximal to the second hatch 208(*b*).

A third control command may similarly be configured to move a third hatch 208(*c*) so as to direct, interrupt, and/or modulate a flow of the second fluid stream 210(*b*) axially proximal to the third hatch 208(*c*), and a fourth control command may be configured to move a fourth hatch 208(*d*) so as to direct, interrupt and/or modulate a flow of the second fluid stream 210(*b*) axially proximal to the fourth hatch 208(*d*).

Figure 8:
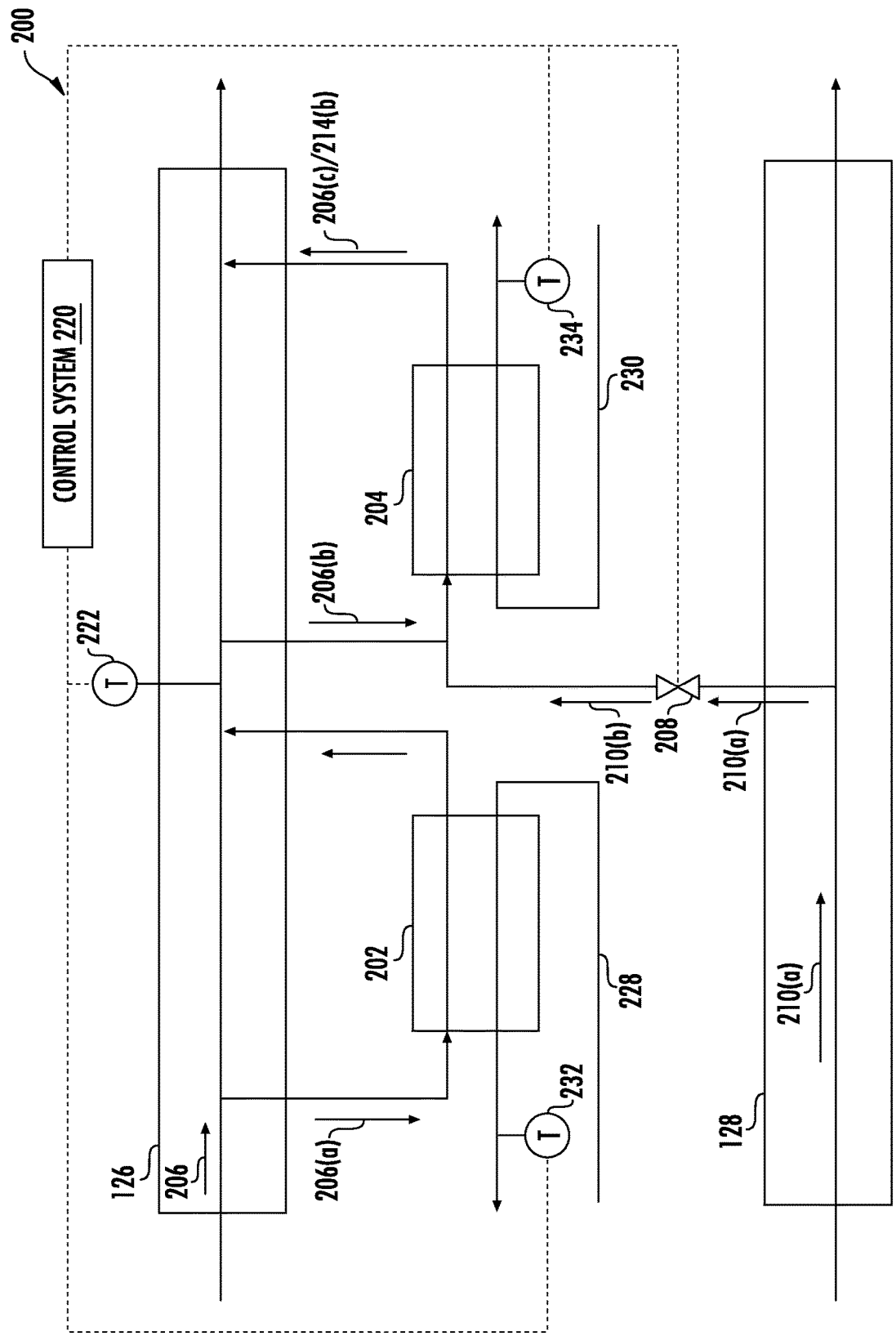
FIG. 8 shows a diagram depicting fluid flows in an exemplary heat management system.

Now referring to FIG. 8, a schematic of an exemplary heat management system 200 is shown. As shown, an exemplary heat management system 200 includes a first duct 126 and a second duct 128. The first duct 126 includes a first fluid stream 206 (e.g., a first bypass air stream) flowing therethrough, and the second duct 128 includes a second fluid stream 210 (e.g., a second bypass air stream) flow therethrough. A first heat exchanger 202 may be configured to transfer heat between a third fluid stream 228 and the first fluid stream 206(*a*)(e.g., cooling air from the first bypass stream). A second heat exchanger 204 may be configured to transfer heat between a fourth fluid stream 230 and the first fluid stream 206(*b*) discharging from the first heat exchanger 202.

In an exemplary embodiment, the first and second heat exchangers 202, 204 may be any thermal management heat exchangers used in connection with a turbomachine 100 or an aircraft. For example, the first heat exchanger 202 may be a compressor bleed air cooler. The first heat exchanger 202 may be configured to cool a stream of bleed air from one or more compressor stages of a turbomachine 100 flowing across or through the first heat exchanger 202. The bleed air may be cooled using a stream of bypass air 206(*a*) from the first duct 126. By cooling the compressor bleed air, the first heat exchanger 202 may provide a heated stream of bypass air 206(*b*). Additionally, or in the alternative, the second heat exchanger 204 may be a cooled cooling air heat exchanger. The second heat exchanger 204 may be configured to cool a stream of turbine cooling air (e.g., high pressure turbine cooling air) flowing across or through the second heat exchanger 204 using the stream of inner bypass air 206(*b*) discharging from the first heat exchanger 202.

In some embodiments, the heated stream of bypass air 206(*b*) may be at such a temperature that improved heat transfer by the second heat exchanger 204 may be desired. For example, the control system 220 may determine, based at least in part on an input from a temperature sensor 222 that a temperature of the first fluid stream 206(*b*) is equal to or greater than a threshold temperature. The temperature sensor 222 may be located at any desired position, such as downstream from the first heat exchanger 202, upstream from the first heat exchanger 202, or downstream from the second heat exchanger 204. The control command may be configured to cause the hatch 208 to move to an open position 224 when the temperature input corresponds to a temperature of the first fluid stream 206(*b*) equal to or greater than a threshold temperature, thereby introducing a second fluid stream 210(*b*) from the second duct 128 to the inlet of the second heat exchanger 204.

Additionally, or in the alternative, the control system 220 may be configured to receive a temperature input from a third temperature sensor 232 configured and arranged to ascertain a temperature of the third fluid stream 228, and/or to receive a temperature input from a fourth temperature sensor 234 configured and arranged to ascertain a temperature of the fourth fluid stream 230. The control system 220 may similarly output a control command to the hatch 208 responsive to a temperature input from the third temperature sensor 232 and/or the fourth temperature sensor 234.

Figure 9:
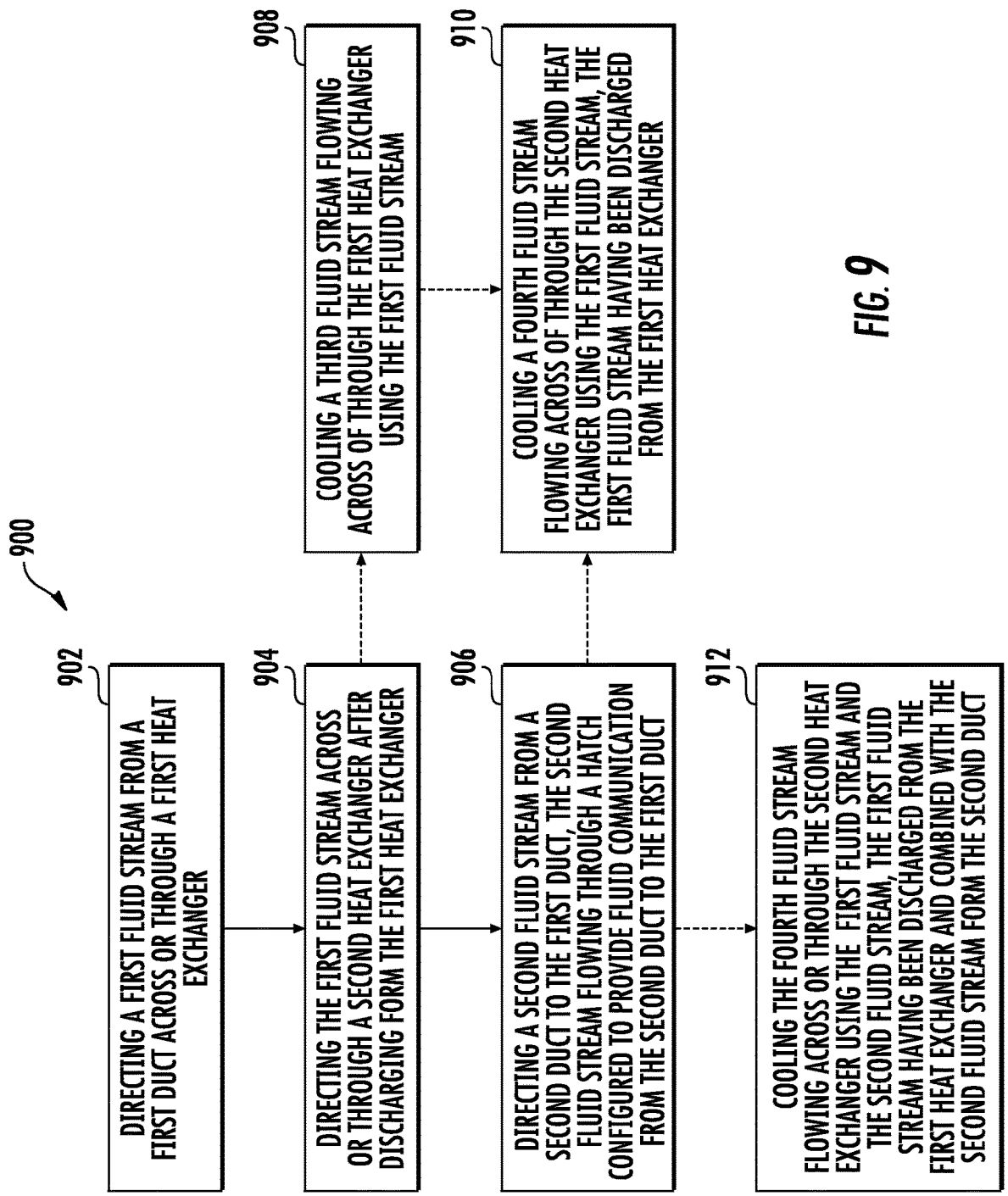
FIG. 9 shows a flow-chart depicting an exemplary method of cooling fluid streams in a heat management system.

Now turning to FIG. 9, exemplary methods 900 of cooling fluid streams in a heat management system 200 will be described. As shown in FIG. 9, an exemplary method 900 may include, at block 902, directing a first fluid stream 206(*a*) from a first duct 126 across or through a first heat exchanger 202, and, at block 904, directing the first fluid stream 206(*b*) across or through a second heat exchanger 204 after discharging from the first heat exchanger 202. The exemplary method 900 may additionally include, at block 906, directing at least a portion of a second fluid stream 210(*b*) from a second duct 128 to the first duct 126, with the second fluid stream 210(*b*) flowing through a hatch 208 configured to provide fluid communication from the second duct 128 to the first duct 126. In some embodiments, block 906 may include directing a first portion of a second fluid stream 210(*b*) at a first axial position from the second duct 128 to the first duct 126 independently from a second portion of the second fluid stream 210(*b*) at a second axial position. The first portion of the second fluid stream 210(*b*) axially proximal to the first hatch 208(*a*) may be directed from the second duct 128 to the first duct 126 at least in part by moving the first hatch 208(*a*) to a first position, and the second portion of the second fluid stream 210(*b*) axially proximal to the second hatch 208(*b*) may be directed from the second duct 128 to the first duct 126 at least in part by moving the second hatch 208(*b*) to a second position, and the first position may differ from the second position. The first and second portions of the second fluid stream 210(*b*) may be independent directed, for example, to account for circumferentially and/or axially varying temperatures, flow rates, etc. and/or to account for circumferentially and/or axially varying heat management requirements.

The exemplary method 900 may additionally include, at block 908, cooling a third fluid stream 228 flowing across or through the first heat exchanger 202 using the first fluid stream 206(*a*). Further, the exemplary method 900 may additionally include, at block 910, cooling a fourth fluid stream 230 flowing across or through the second heat exchanger 204 using the first fluid stream 206(*b*) after having been discharged from the first heat exchanger 202. In an exemplary embodiment, the method 900 may include, at block 912, cooling the fourth fluid stream 230 flowing across or through the second heat exchanger 204 using the first fluid stream 206(*b*) and the second fluid stream 210(*b*), with the first fluid stream 206(*b*) having been discharged from the first heat exchanger 202 and combined with the second fluid stream 210(*b*) from the second duct 128.

In some embodiments, block 906 may include directing at least a portion of the second fluid stream 210(*b*) from the second duct 128 to the first duct 126 when a temperature of the first fluid stream 206(*b*) reaches or exceeds a threshold temperature. For example, block 906 may include directing a first portion of the second fluid stream 210(*b*) axially proximal to a first hatch 208(*a*) from the second duct 128 to the first duct 126 when a first temperature input from a first temperature sensor 222(*a*) corresponds to a temperature of the first fluid stream 206(*b*) axially proximal to the first hatch 208(*a*) equal to or greater than a first threshold temperature. Block 906 may additionally or alternatively include directing a second portion of the second fluid stream 210(*b*) axially proximal to a second hatch 208(*b*) from the second duct 128 to the first duct 126 when a second temperature input from a second temperature sensor 222(*b*) corresponds to a temperature of the first fluid stream 206(*b*) axially proximal to the second hatch 208(*b*) equal to or greater than a second threshold temperature. A third portion of the second fluid stream 210(*b*) axially proximal to a third hatch 208(*c*) and/or a fourth portion of the second fluid stream 210(*b*) axially proximal to a fourth hatch 208(*d*) may similarly be directed from the second duct 128 to the first duct 126.

Additionally, or in the alternative, block 906 may include interrupting at least a portion of the second fluid stream 210(*b*) flowing from the second duct 128 to the first duct 126 when the temperature of the first fluid stream 206(*b*) falls below the threshold temperature. For example, block 906 may include interrupting a first portion of the second fluid stream 210(*b*) axially proximal to a first hatch 208(*a*) flowing from the second duct 128 to the first duct 126 when a first temperature input from a first temperature sensor 222(*a*) corresponds to a temperature of the first fluid stream 206(*b*) axially proximal to the first hatch 208(*a*) less than a first threshold temperature. Block 906 may additionally or alternatively include interrupting a second portion of the second fluid stream 210(*b*) axially proximal to a second hatch 208(*b*) flowing from the second duct 128 to the first duct 126 when a second temperature input from a second temperature sensor 222(*b*) corresponds to a temperature of the first fluid stream 206(*b*) axially proximal to the second hatch 208(*b*) less than a second threshold temperature. A third portion of the second fluid stream 210(*b*) axially proximal to a third hatch 208(*c*) and/or a fourth portion of the second fluid stream 210(*b*) axially proximal to a fourth hatch 208(*d*) may similarly be interrupted from flowing from the second duct 128 to the first duct 126.

Further in addition or in the alternative, block 906 may include modulating at least a portion of a flow of the second fluid stream 210(*b*) from the second duct 128 to the first duct 126 based at least in part on a temperature of the first fluid stream 206(*b*). For example, block 906 may include modulating a first portion of the second fluid stream 210(*b*) axially proximal to a first hatch 208(*a*) flowing from the second duct 128 to the first duct 126 based at least in part on a first temperature input from a first temperature sensor 222(*a*) corresponding to a temperature of the first fluid stream 206(*b*) axially proximal to the first hatch 208(*a*). Block 906 may additionally or alternatively include modulating a second portion of the second fluid stream 210(*b*) axially proximal to a second hatch 208(*b*) from the second duct 128 to the first duct 126 based at least in part on a second temperature input from a second temperature sensor 222(*b*) corresponding to a temperature of the first fluid stream 206(*b*) axially proximal to the second hatch 208(*b*). A third portion of the second fluid stream 210(*b*) axially proximal to a third hatch 208(*c*) and/or a fourth portion of the second fluid stream 210(*b*) axially proximal to a fourth hatch 208(*d*) may be similarly modulated.

In some embodiments, block 906 may include directing at least a portion of the second fluid stream 210(*b*) from the second duct 128 to the first duct 126 when a temperature of the fourth fluid stream 230 reaches or exceeds a fourth threshold temperature and/or when a temperature of the third fluid stream 228 reaches or exceeds a third threshold temperature.

In exemplary methods 900, block 908, may include cooling a stream of compressor bleed air 228 flowing across or through the first heat exchanger 202 using the first fluid stream 206(*a*). By way of example, the first duct 126 may include an annular outer bypass duct and the first fluid stream 206(*a*) may include outer bypass air. The cooling performed at block 908 may provide a heated stream of outer bypass air 206(*b*). An exemplary method 900 may further include, at block 910, cooling a stream of turbine cooling air 230 flowing across or through the second heat exchanger 204 using the heated stream of outer bypass air 206(*b*). Further, at block 912, an exemplary method 900 may include combining the heated stream of outer bypass air 206(*b*) with the second fluid stream 210(*b*) from the second duct 128. By way of example, the second duct 128 may include an annular inner bypass duct and the second fluid stream 210(*b*) may include inner bypass air from the second duct (e.g., an annular inner bypass duct) 128 having been introduced into the first duct 126 through the hatch 208.

Figure 10:
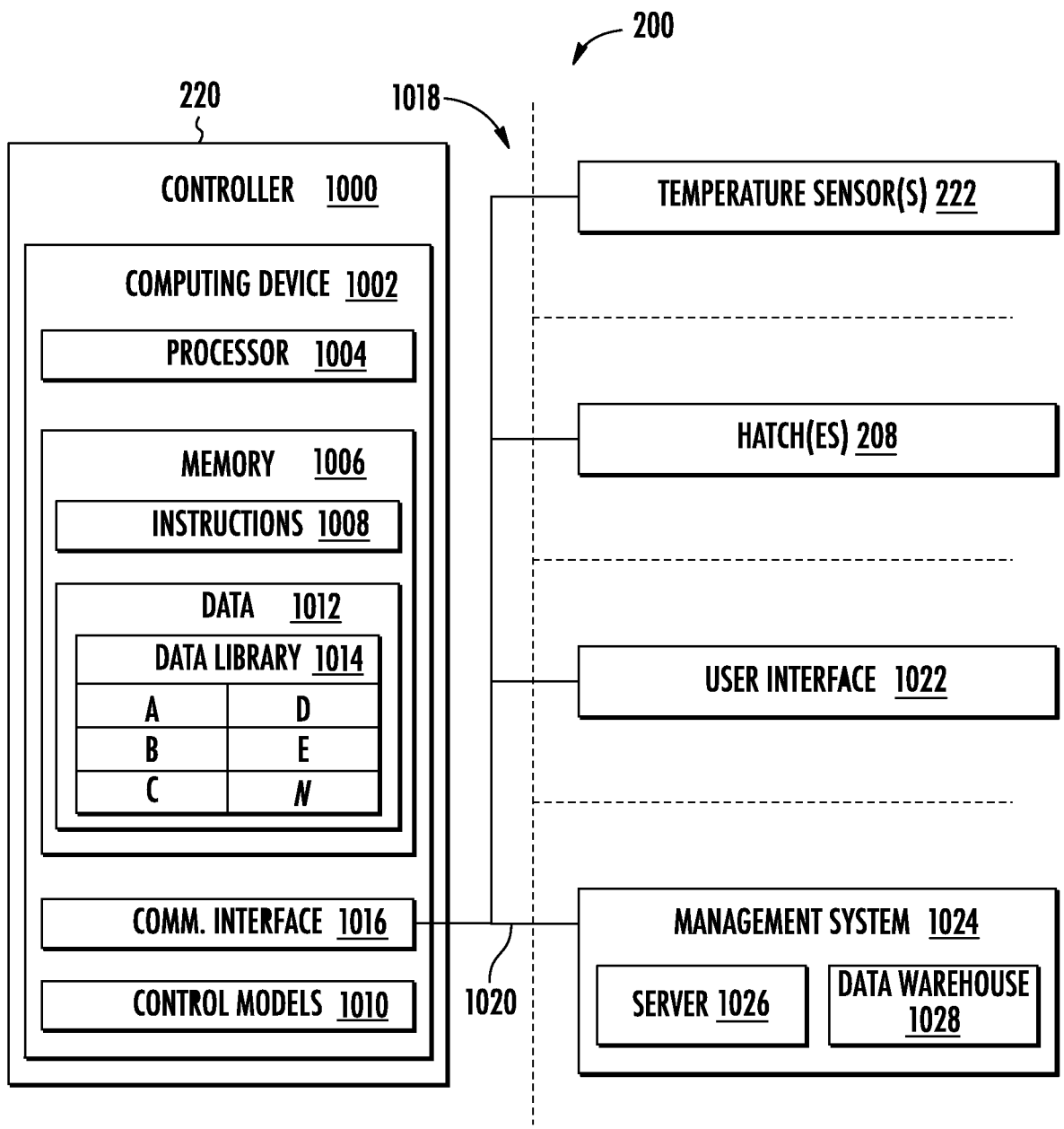
FIG. 10 schematically depicts an exemplary control system of a heat management system.

Now turning to FIG. 10, an exemplary control system 220 of a heat management system 200 will be described in further detail. An exemplary control system 220 includes a controller 1000 communicatively coupled with one or more hatches 208 and one or more temperature sensors 222. By way of example, a control system 220 may include or be incorporated into a full authority direct engine control (FADEC) system or an engine control unit (ECU) for a turbomachine 100 and/or an aircraft.

The controller 1000 may include one or more computing devices 1002, which may be located locally or remotely relative to the control system 220 and/or the turbomachine 100. The one or more computing devices 1002 may include one or more processors 1004 and one or more memory devices 1006. The one or more processors 1004 may include any suitable processing device, such as a microprocessor, microcontroller, integrated circuit, logic device, and/or other suitable processing device. The one or more memory devices 1006 may include one or more computer-readable media, including but not limited to non-transitory computer-readable media, RAM, ROM, hard drives, flash drives, and/or other memory devices.

The one or more memory devices 1006 may store information accessible by the one or more processors 1004, including machine-executable instructions 1008 that can be executed by the one or more processors 1004. The instructions 1008 may include any set of instructions which when executed by the one or more processors 1004 cause the one or more processors 1004 to perform operations. In some embodiments, the instructions 1008 may be configured to cause the one or more processors 1004 to perform operations for which the controller 1000 and/or the one or more computing devices 1002 are configured. Such operations may include operations of the control system 220, such as controlling the one or more hatches 208 as described herein. Such operations may further additionally or alternatively include receiving inputs from the one or more temperature sensors 222 and controlling the one or more hatches 208 responsive to the one or more temperature sensors 222. Such operations may additionally or alternatively be carried out according to control commands provided by a control model 1010. As examples, exemplary control models 1010 may include one or more control models 1010 configured to determine a temperature of a fluid stream and/or a rate of heat transfer effected by a heat exchanger 202, 204 and to output a control command configured to control the one or more hatches 208 responsive thereto. The machine-executable instructions 1008 can be software written in any suitable programming language or can be implemented in hardware. Additionally, and/or alternatively, the instructions 1008 can be executed in logically and/or virtually separate threads on processors 1004.

The memory devices 1006 may store data 1012 accessible by the one or more processors 1004. The data 1012 can include current or real-time data, past data, or a combination thereof. The data 1012 may be stored in a data library 1014. As examples, the data 1012 may include data 1012 associated with or generated by the turbomachine 100, the heat management system 200, and/or the control system 220, including data 1012 associated with or generated by a controller 1000, the control model(s) 1010, the one or more temperature sensors 222, and/or a computing device 1002. The data 1012 may also include other data sets, parameters, outputs, information, associated with a turbomachine 100 and/or a heat management system 200.

The one or more computing devices 1002 may also include a communication interface 1016, which may be used for communications with a communications network 1018 via wired or wireless communication lines 1020. The communication interface 1016 may include any suitable components for interfacing with one or more network(s), including for example, transmitters, receivers, ports, controllers, antennas, and/or other suitable components. The communication interface 1016 may allow the computing device 1002 to communicate various aspects of the turbomachine 100 and/or the heat management system 200. The communication network 1018 may include, for example, a local area network (LAN), a wide area network (WAN), SATCOM network, VHF network, a HF network, a Wi-Fi network, a WiMAX network, a gatelink network, and/or any other suitable communications network 1018 for transmitting messages to and/or from the controller 1000 across the communication lines 1020. The communication lines 1020 of communication network 1018 may include a data bus or a combination of wired and/or wireless communication links.

The communication interface 1016 may additionally or alternatively allow the computing device 1002 to communicate with a user interface 1022 and/or a central data system 1024. The central data system 1024, which may include a server 1026 and/or a data warehouse 1028. As an example, at least a portion of the data 1012 may be stored in the data warehouse 1028, and the server 1026 may be configured to transmit data 1012 from the data warehouse 1028 to the computing device 1002, and/or to receive data 1012 from the computing device 1002 and to store the received data 1012 in the data warehouse 1028 for further purposes. The server 1026 and/or the data warehouse 1028 may be implemented as part of a control system 220.

Exemplary heat management systems 200 may be implemented within the context of a turbomachine 100, such as a turbomachine 100 installed on an aircraft. The operations and methods described herein may be carried out, for example, during flight, as well as during pre-flight and/or post-flight procedures. As described with reference to FIGS. 1A, 2A, 3A, and 4A, an exemplary turbomachine 100 may include a core engine 122, an annular first casing 120 surrounding the core engine 122, an annular second casing 124 spaced radially outward from the first casing 120 and concentric therewith, and an annular third casing 130 spaced radially between the first casing 120 and the second casing 124 and concentric therewith. A first duct 126 may be defined radially between the annular first casing 120 and the annular third casing 130, and a second duct 128 may be defined radially between the annular second casing 124 and the annular third casing 130.

In exemplary embodiments, a plurality of first heat exchangers 202 may be disposed radially about the first duct 126, with the plurality of first heat exchangers 202 respectively configured and arranged to receive a respective portion of a first fluid stream 206(*a*) from the first duct 126. A plurality of second heat exchangers 204 may be disposed radially about the first duct 126 downstream from the plurality of first heat exchangers 202, with the plurality of second heat exchangers 204 respectively configured and arranged to receive a respective portion of the first fluid stream 206(b) after discharging from respective ones of the plurality of first heat exchangers 202. A plurality of hatches 208 may be disposed radially about the annular third casing 130. The plurality of hatches 208 may respectively provide fluid communication from the second duct 128 to the first duct 126 downstream from the plurality of first heat exchangers 202. For example, the plurality of hatches 208 may be respectively configured and arranged to introduce a respective portion of a second fluid stream 210(b) from the second duct 128 to the first duct 126.

An exemplary turbomachine 100 having a heat management system 200 may additionally include a control system 220 operably coupled to a temperature sensor 222 and the hatch 208. The control system 220 may be configured to receive a temperature input from the temperature sensor 222 and to output a control command to the hatch 208 responsive to the temperature input from the temperature sensor 222. The control command may be configured to cause the hatch 208 to move to an open position 224 when the temperature input corresponds to a temperature of the first fluid stream 206(b) equal to or greater than a threshold temperature. With the hatch 208 at the open position, the hatch 208 may the second fluid stream 210(b) from the second duct 128 to the first duct 126. Additionally, or in the alternative, the control command may be configured to cause the hatch 208 to move to a closed position 226 when the temperature input corresponds to a temperature of the first fluid stream 206(b) less than the threshold temperature. With the hatch 208 at the closed position, the hatch 208 may interrupt the second fluid stream 210(b) flowing from the second duct 128 to the first duct 126. Further additionally or alternatively, the control command may be configured to cause the hatch 208 to move between the open position 224 and the closed position 226 based at least in part on the temperature input, such that the hatch 208 may modulate a flow of the second fluid stream 210(b) from the second duct 128 to the first duct 126.

In an exemplary embodiment, the first duct 126 may include an annular inner bypass duct of the turbomachine 100, and/or the second duct 128 may include an annular outer bypass duct of the turbomachine 100. Additionally, or in the alternative, the first duct 126 may include an annular outer bypass duct of the turbomachine 100, and/or the second duct 128 may include an annular inner bypass duct of the turbomachine 100. In other embodiments, the first duct 126 may be a thermal management duct of a turbomachine 100 and the second duct 128 may be a bypass duct of a turbomachine 100.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat management system for a turbomachine, comprising:
   a first heat exchanger configured and arranged to receive a first fluid stream from a first duct;
   a second heat exchanger configured and arranged to receive the first fluid stream after discharging from the first heat exchanger; and
   a hatch configured to provide fluid communication from a second duct to the first duct so as to introduce a second fluid stream from the second duct to the first duct.

2. The heat management system of claim 1, wherein the hatch comprises an air scoop, the air scoop comprising a raised inlet extending into the second duct and/or a submerged inlet extending into the first duct.

3. The heat management system of claim 1, wherein the hatch comprises a door, the door being movable between an open position and a closed position, and the hatch providing fluid communication from the second duct to the first duct with the door positioned at the open position.

4. The heat management system of claim 3, wherein the door interrupts fluid communication from the second duct to the first duct with the door positioned at the closed position.

5. The heat management system of claim 3, wherein the hatch comprises an air scoop.

6. The heat management system of claim 3, wherein the door is movable among a plurality of open positions so as to modulate the second fluid stream from the second duct flowing to the second heat exchanger inlet.

7. The heat management system of claim 1, comprising:
   at least a portion of the first heat exchanger disposed within the first duct; and/or
   at least a portion of the second heat exchanger disposed within the first duct.

8. The heat management system of claim 1, wherein the first duct comprises an annular inner bypass duct of the turbomachine and/or wherein the second duct comprise an annular outer bypass duct of the turbomachine; or
   wherein the first duct comprises an annular outer bypass duct of the turbomachine and/or wherein the second duct comprise an annular inner bypass duct of the turbomachine.

9. The heat management system of claim 1, wherein the first duct comprises a heat management system duct of the turbomachine.

10. The heat management system of claim 1, comprising:
    a plurality of first heat exchangers disposed radially about the first duct, the plurality of first heat exchangers respectively configured and arranged to receive a respective portion of the first fluid stream from the first duct;
    a plurality of second heat exchangers disposed radially about the first duct downstream from the plurality of first heat exchangers, the plurality of second heat exchangers respectively configured and arranged to receive a respective portion of the first fluid stream after discharging from respective ones of the plurality of first heat exchangers; and
    a plurality of hatches respectively providing fluid communication from the second duct to the first duct downstream from the plurality of first heat exchangers, the plurality of hatches respectively configured and arranged to introduce a respective portion of the second fluid stream from the second duct to the first duct.

11. A method of cooling fluid streams, the method comprising:
    directing a first fluid stream from a first duct across or through a first heat exchanger;

directing the first fluid stream across or through a second heat exchanger after discharging from the first heat exchanger; and directing a second fluid stream from a second duct to the first duct, the second fluid stream flowing through a hatch configured to provide fluid communication from the second duct to the first duct.

12. The method of claim 11, comprising:

directing at least a portion of the second fluid stream from the second duct to the first duct when a temperature of the first fluid stream reaches or exceeds a threshold temperature; and/or interrupting at least a portion of the second fluid stream flowing from the second duct to the first duct when the temperature of the first fluid stream falls below the threshold temperature; and/or modulating at least a portion of a flow of the second fluid stream from the second duct to the first duct based at least in part on a temperature of the first fluid stream.

13. The method of claim 11, comprising:

cooling a third fluid stream flowing across or through the first heat exchanger using the first fluid stream; and cooling a fourth fluid stream flowing across or through the second heat exchanger using the first fluid stream, the first fluid stream having been discharged from the first heat exchanger.

14. The method of claim 11, comprising:

directing the second fluid stream from the second duct to the first duct when a temperature of the fourth fluid stream reaches or exceeds a fourth threshold temperature and/or when a temperature of the third fluid stream reaches or exceeds a third threshold temperature.

15. The method of claim 14, comprising:

cooling the fourth fluid stream flowing across or through the second heat exchanger using the first fluid stream and the second fluid stream, the first fluid stream having been discharged from the first heat exchanger and combined with the second fluid stream from the second duct.

16. The method of claim 11, comprising:

cooling a stream of compressor bleed air flowing across or through the first heat exchanger using the first fluid stream, the first duct comprising an annular outer bypass duct and the first fluid stream comprising outer bypass air, the cooling providing a heated stream of outer bypass air;

cooling a stream of turbine cooling air flowing across or through the second heat exchanger using the heated stream of outer bypass air; and combining the heated stream of outer bypass air with the second fluid stream from the second duct, the second duct comprising an annular inner bypass duct and the second fluid stream comprising inner bypass air from the annular inner bypass duct having been introduced into the first duct through the hatch.

17. A turbomachine, comprising:

a core engine;

an annular first casing surrounding the core engine;

an annular second casing spaced radially outward from the first casing and concentric therewith;

an annular third casing spaced radially between the first casing and the second casing and concentric therewith;

a first duct defined radially between the annular first casing and the annular third casing;

a second duct defined radially between the annular second casing and the annular third casing;

a plurality of first heat exchangers disposed radially about the first duct, the plurality of first heat exchangers respectively configured and arranged to receive a respective portion of a first fluid stream from the first duct;

a plurality of second heat exchangers disposed radially about the first duct downstream from the plurality of first heat exchangers, the plurality of second heat exchangers respectively configured and arranged to receive a respective portion of the first fluid stream after discharging from respective ones of the plurality of first heat exchangers; and a plurality of hatches disposed radially about the annular third casing, the plurality of hatches respectively providing fluid communication from the second duct to the first duct downstream from the plurality of first heat exchangers, the plurality of hatches respectively configured and arranged to introduce a respective portion of a second fluid stream from the second duct to the first duct.

18. The turbomachine of claim 17, comprising:

a control system operably coupled to a temperature sensor and the hatch, the control system configured to receive a temperature input from the temperature sensor and to output a control command to the hatch responsive to the temperature input from the temperature sensor, the control command configured to cause the hatch to:

move to an open position when the temperature input corresponds to a temperature of the first fluid stream equal to or greater than a threshold temperature, the hatch at the open position directing the second fluid stream from the second duct to the first duct; and/or move to a closed position when the temperature input corresponds to a temperature of the first fluid stream less than the threshold temperature, the hatch at the closed position interrupting the second fluid stream flowing from the second duct to the first duct; and/or move between the open position and the closed position based at least in part on the temperature input, the hatch modulating a flow of the second fluid stream from the second duct to the first duct.

19. The turbomachine of claim 17, wherein the first duct comprises an annular inner bypass duct of the turbomachine and/or wherein the second duct comprise an annular outer bypass duct of the turbomachine; or wherein the first duct comprises an annular outer bypass duct of the turbomachine and/or wherein the second duct comprise an annular inner bypass duct of the turbomachine.

20. The turbomachine of claim 17, wherein the first duct comprises a heat management system duct of the turbomachine.

* * * * *